United States Patent [19]
Bennett et al.

[11] Patent Number: 5,561,793
[45] Date of Patent: Oct. 1, 1996

[54] SYSTEM AND METHODS FOR DATA FIELD MANAGEMENT IN A COMPUTER DATABASE SYSTEM

[75] Inventors: John G. Bennett, San Mateo; Steven T. Shaughnessy, Scotts Valley; Christopher W. Brumme, Boulder Creek, all of Calif.

[73] Assignee: Borland International, Inc., Scotts Valley, Calif.

[21] Appl. No.: 109,033

[22] Filed: Aug. 18, 1993

Related U.S. Application Data

[63] Continuation-in-part of Ser. No. 933,480, Aug. 20, 1992.
[51] Int. Cl.⁶ .................................................. G06F 17/30
[52] U.S. Cl. ................ 395/600; 364/282.1; 364/DIG. 1; 395/149
[58] Field of Search ....................... 364/DIG. 1, DIG. 2; 395/600, 147–149, 155, 161

[56] References Cited

U.S. PATENT DOCUMENTS

| | | | |
|---|---|---|---|
| 5,063,501 | 11/1991 | Jordan, Jr. | 395/725 |
| 5,321,610 | 6/1994 | Breslin | 364/419.19 |
| 5,339,424 | 8/1994 | Fushimi | 395/650 |
| 5,353,401 | 10/1994 | Iizawa et al. | 395/161 |
| 5,369,778 | 11/1994 | San Soucie et al. | 395/800 |
| 5,392,390 | 2/1995 | Crozier | 395/161 |
| 5,396,613 | 3/1995 | Hollaar | 395/575 |
| 5,404,294 | 4/1995 | Karnik | 364/419.1 |
| 5,404,488 | 4/1995 | Kerrigan et al. | 395/425 |
| 5,414,809 | 5/1995 | Hogan et al. | 395/155 |

FOREIGN PATENT DOCUMENTS

| | | | |
|---|---|---|---|
| 2077949 | 3/1990 | Japan | G06F 12/00 |

OTHER PUBLICATIONS

"Lock Management Architecture," *IBM Technical Disclosure Bulletin* (1988) 31:125–128.
"Conditional Locking of Nonroot Index Pages," *IBM Technical Disclosure Bulletin* (1989) 32:57–58.
"Processor for Distributed Cross System Locks," *IBM Technical Disclosure Bulletin* (1978) 20:4760–4762.
*dBASE IV for Developers, Programming with dBASE IV*, Ashton–Tate Corporation, 1988, 1990, pp. 3–9 to 3–12.
*Language Reference, Appendix E: Structure of a Database (.dbf) File*, Ashton–Tate Corporation, 1988, 1990, pp. E–1 to E–4.
*REFLEX User's Guide, Chapter 1: Creating and Modifying a Database*, Borland International, Inc., 1984, 1989, pp. 7–36.
Townsend, C., *Mastering dBASE IV Programming, Chapter 20: Using Memo Fields*, Sybex, Inc., 1989, pp. 331–342.

*Primary Examiner*—Thomas G. Black
*Assistant Examiner*—Maria N. Von Buhr
*Attorney, Agent, or Firm*—John A. Smart; Michael J. Ritter

[57] ABSTRACT

A system of the present invention includes a relational database management system (RDBMS). Methods are described for maintaining integrity between "design documents," which may be creating under different operating systems, and one or more information tables of the system. The system provides each field of a table with a unique ID ("field ID") for tracking the field regardless of restructuring changes which may be made to the table by various clients. Corresponding field IDs are stored with the fields of design documents, thereby permitting the system to maintain a link between a design document and its table. Upon a restructure of a table, the dependent design documents may be appropriately updated by their respective clients. Methods are also described for improved storage of free-form or "memo" data. In a preferred embodiment, memo data are stored in a separate file comprised of variable-length storage blocks. Methods are described for allocating storage space in the blocks and sub-allocating storage space within a block. For increased efficiency, the system maintains a sorted "free list" of free storage blocks.

22 Claims, 33 Drawing Sheets
(1 Microfiche 27 Frames)

FIG. 3C

INFORMATION TABLES 375

CUSTOMER.DB
| CUSTOMER NO | NAME | STREET | CITY | STATE/PROV | ZIP/POSTAL CODE | COUNTRY | PHONE | FIRST CONTACT |

ORDERS.DB
| ORDER NO | CUSTOMER NO | SALE DATE | SHIP DATE | SHIP VIA | TOTAL INVOICE | AMOUNT PAID | BALANCE DUE | TERMS | PAYMENT METHOD | MONTH |

LINEITEM.DB
| ORDER NO | STOCK NO | SELLING PRICE | QTY | TOTAL |

STOCK.DB
| STOCK NO | VENDOR NO | EQUIPMENT CLASS | MODEL | PART NO | DESCRIPTION | CATALOG DESCRIPTION | QTY | LIST PRICE |

VENDORS.DB
| VENDOR NO | VENDOR NAME | STREET | CITY | STATE/PROV | COUNTRY | ZIP/POSTAL RT | PHONE | FAX | PREFERRED |

POSSIBLE LINKS ........

*FIG. 3F*

TABLE

HEADER:

FIELDS:

| FLD_NAME | FLD_TYPE |
|---|---|
| CUST. NO. | N* |
| NAME | A30 |
| STREET | A30 |
| CITY | A15 |
| STATE | A2 |
| ... | ... |

RECORDS:
.
.

TABLE
(.DB FILE)
510

CREATE FORM (IN DOS)

DOS FORM

NEW CUSTOMER FORM

| CUSTOMER NO. | [CUST. NO.: N*] |
|---|---|

| NAME | [NAME: A30] |
|---|---|

| ADDRESS | [STREET: A30] |
|---|---|

| TOWN | [TOWN: A15] | STATE | [STATE: A2] |
|---|---|---|---|

FORM
(DOS)
520

*FIG. 5A*

TABLE
HEADER:

| FIELDS: | |
|---|---|
| FLD_NAME | FLD_TYPE |
| CUST. NO. | N* |
| NAME | A20 |
| STREET | A30 |
| CITY | A15 |
| STATE | A2 |
| ... | ... |

RECORDS:
.
.

TABLE
(.DB FILE)
510

RESTRUCTURE TABLE IN DOS
─────────────────────────

TABLE:
(1) ADD SEX FIELD
(2) INCREASE WIDTH OF STREET FIELD
(3) RENAME "TOWN" TO "CITY"

UPDATE DOS FORM WITH NEW FIELD PARAMETERS

TABLE
HEADER:

| FIELDS: | |
|---|---|
| FLD_NAME | FLD_TYPE |
| CUST. NO. | N* |
| SEX | A7 |
| NAME | A30  ←513 |
| ADDRESS | A240 |
| TOWN | A15 ←515 |
| STATE | A2  ←517 |
| ... | ... |

RECORDS:
.
.

TABLE
(.DB FILE)
511

NEW CUSTOMER FORM                    523

| CUST. NO. | [CUST. NO.: N*] | SEX | [SEX: A7] |

| NAME | [NAME: A30] |

| ADDRESS | [ADDRESS: A240] |

| TOWN | [TOWN: A15] | STATE | |

525          FORM (DOS) 521          [STATE: A2]

*FIG. 5C*

| Model | Part No | Description | Catalog Description | Qty |
|---|---|---|---|---|
| DV-100 | T-5100 | Underwater Diver Vehicle | Featuring a three-speed motor, this | 6.00 |
| IB-DV | 7160-00 | Underwater Diver Vehicle | This all new diver vehicle employs the l | 5.00 |
| MK-200/G200 | 12-200-000 | Regulator System | The MK-200 features a low pressure-drop | 165.00 |
| TR-200 | 6632-14A | Second Stage Regulator | The TR-200 was designed for high | 98.00 |
| MK-10/G200 B | 12-502-000 | Regulator System | The MK-10 is the ultimate first stage wi | 75.00 |
| G-200 B | 11-202-000 | Second Stage Regulator | This adjustable second stage was first i | 37.00 |
| MK-10/D350 | 12-509-000 | Regulator System | The MK10/D350 is a performance | 166.00 |
| A.I.R.-2 | 21-085-000 | Alternate Inflation Regulator | The A.I.R.-2 was introduced in 1979. It | 47.00 |
| D-350 | 11-012-000 | Second Stage Regulator | The D-350 includes all high-tech feature | 128.00 |
| MK-10 | 10-500-000 | First Stage Regulator | The MK-10 provides easy inhalation and | 146.00 |
| Stip-AB | 1642A-1406 | Second Stage Regulator | This pneumatically balanced second | 13.00 |
| Dep-100 | 23B-4501 | Depth/Pressure Gauge Console | This is an oil filled analog gauge in a | 25.00 |
| AR 3200 | 28-065-000 | Electronic Console | This electronic console provides a digit | 13.00 |
| V.I.P. 1990 | 28-073-000 | Depth/Pressure Gauge | This gauge is designed for higher servic | 226.00 |
| Son86-45 | 28-040-000 | Personal Dive Sonar | This hand-held personal sonar is designe | 46.00 |
| 99Typ1 | 28-033-008 | Compass Console Mount | The compass mount comes with a wrist | 211.00 |
| LS-1 | 28-519-004 | Compass (meter only) | This compass features molded-in bezel | 168.00 |
| V.I.P. SPG | 28-085-000 | Depth/Pressure Gauge | This V.I.P. console features a submersib | 128.00 |
| AR 4200 | 28-066-000 | Electronic Console w/ options | This console is the same as Stock | 24.00 |
| YYZ-344 | 3604-00 | Direct Sighting Compass | This easy-to-read compass features a | 15.00 |
| S.P.-25 | 3490-00 | Dive Computer | This quality dive computer and planner m | 5.00 |
| YYZ-500 | 3600-00 | Navigation Compass | Phosphorescent needle and lubber lines | 8.00 |
| F-200 | 3503-00 | Wrist Band Thermometer (F) | This dependable thermometer reads from | 6.00 |
| HT-7 | 3457-00 | Depth/Pressure Gauge (Digital) | This digital pressure gauge is construct | 12.00 |
| HT-2 | 3451-00 | Depth/Pressure Gauge (Analog) | This analog pressure gauge is constructe | 16.00 |
| C-200 | 3504-00 | Wrist Band Thermometer (C) | This dependable thermometer reads from | 12.00 |
| 23IIA | 16A-23 | Dive Computer | This is a true multi-level computer that | 45.00 |

FIG. 7E

SYSTEM AND METHODS FOR DATA FIELD MANAGEMENT IN A COMPUTER DATABASE SYSTEM

The present application is a continuation-in-part application of application Ser. No. 07/933,480, filed Aug. 20, 1992, pending the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to storing, retrieving, and presenting information in a data processing system, such as a Database Management System (DBMS).

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand. Of these systems, ones which are of particular interest to the present invention are Relational Database Management Systems (RDBMSs).

The concept of relational databases is perhaps best introduced by reviewing the problems surrounding traditional or non-relational systems. In a traditional database system, the task of retrieving information of interest (i.e., answering a "database query") is left to the user; that is, the user must give detailed instructions to the system on exactly how the desired result is to be obtained.

Consider the example of a simple query: "Who are the teachers of student John Smith?" In a traditional system, several explicit instructions are required before the query can be answered. One instruction, for instance, is typically to instruct the system to allocate sections in memory for data to be read from a storage disk. Another command may tell the system which disk files to open and read into the allocated memory for processing. Still other commands may specify particular search strategies, such as use of specific indexes, for speeding up the result of the query. And still even further commands may be needed for specifying explicit links between two or more files so that their data may be combined. Thus, instead of just telling the system "what" is desired (i.e., the desired data result as expressed in a query expression), one must specify internal procedures (i.e., the "how") for obtaining the data. Even for a simple query, such as that above, the task is complex, tedious, and error-prone.

From the user's perspective, such details—ones directed to the physical implementation—are completely irrelevant; the user is interested only in the result. Thus, the lack of separation of logical operations from the physical representation of the data (i.e., how it is internally stored and accessed by the system) in traditional systems burdens users with unnecessary complexity. Moreover, as traditional database products employ proprietary data access procedures, knowledge of one product is not necessarily helpful in use of another. And where database systems differ, their practitioners cannot effectively communicate with one another.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be described in turn.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems*, Volumes I and II, Addison Wesley, 1990; the disclosures of which are hereby incorporated by reference.

Today, relational systems are everywhere—commonly seen operating in corporate, government, academic settings, and other shared environments. With the movement of data processing chores from mainframe computers to networked desktop computers, a particular problem has arisen however. Often a company's data will be maintained in information tables on one system but viewed in forms and reports of other systems. For instance, a company may maintain sales data on a file server operating under Novell NetWare on the one hand, with individual users viewing that information in various forms and reports at client workstations operating under disparate operating systems (e.g., MS/PC-DOS Windows, Macintosh, and the like) on the other hand. As a result, discrepancies between the information tables and their clients may occur. If one client modifies the structure of a table, for instance, the forms and reports of other clients which are dependent on that table may be rendered inconsistent (with the table) or even invalid.

Another problem besets present day RDBMS. Often the need arises to store with a tuple data which does not fall within a known data type (e.g., alphanumeric, number, date, and the like) or form. Also, such data objects often require a vast range of storage allocation, ranging from a few bytes to many megabytes of storage space. And with increasing popularity of multimedia, the problem can be expected to become more acute.

Prior art approaches to storing this free-form or "memo" data have included so-called memo files employing fixed-length storage blocks. In dBASE III®, for instance, a table of database records would store memo information in an accompanying memo file comprising 512-byte storage blocks. The approach is very wasteful: a record having only 40 bytes of memo information would require as much storage space as one having 500 bytes. Moreover, such conventional systems include no free-space management which would allow reclamation of storage space which has been freed (e.g., after its corresponding database table record has been deleted).

SUMMARY OF THE INVENTION

A system of the present invention includes a relational database management system (RDBMS), where information is maintained in one or more database tables for easy, efficient storage and retrieval. In addition to database tables, the system provides "design documents" which allow a user to customize how his or her data are presented, including formats which are not tabular. Design documents can also link together different tables, so that information stored in separate tables appears to the user to come from one place.

Methods are described for maintaining integrity between design documents, which may be created under different operating systems, and one or more tables of the system. The system provides each field of a table with a unique ID ("field ID") for tracking the field regardless of restructuring changes which may be made to the table. Corresponding field IDs are stored with the fields of design documents, thereby permitting the system to maintain a link between a design document and its table(s). Upon a restructure of a table, the dependent design documents may be appropriately updated by their respective clients.

Methods are also described for improved storage of free-form or "memo" data. In a preferred embodiment, memo data are stored in a separate file comprised of variable-length storage blocks. Methods are described for allocating storage space in the blocks and sub-allocating storage space within a block. For increased efficiency, the system maintains a sorted "free list" of free storage blocks.

BRIEF DESCRIPTION OF THE DRAWINGS

FIGS. 3C–E are bitmap screenshots illustrating use of the Desktop's client area for displaying and manipulating major objects of the system, including table objects, form objects, report objects, and the like.

FIG. 3F is a block diagram of a sample database system for tracking sales orders.

FIGS. 3G–K are bitmap screenshots illustrating the structuring of information tables for the system of FIG. 3F.

FIG. 5A is a diagram illustrating the creation of a form having data entry fields which correspond to fields of an information table.

FIG. 5C is a diagram illustrating an exemplary restructuring change of the table of FIG. 5A which the user of the form of FIG. 5A may desire to make.

FIGS. 6A–B are diagrams illustrating use of field IDs of the present invention for identifying data entry fields of a form, regardless of the user interface which the form may be optimized to work in.

FIG. 7E is a screen bitmap illustrating a table or "browse" view of the Stock table, the view including memo file information for each tuple.

Figure 1A:
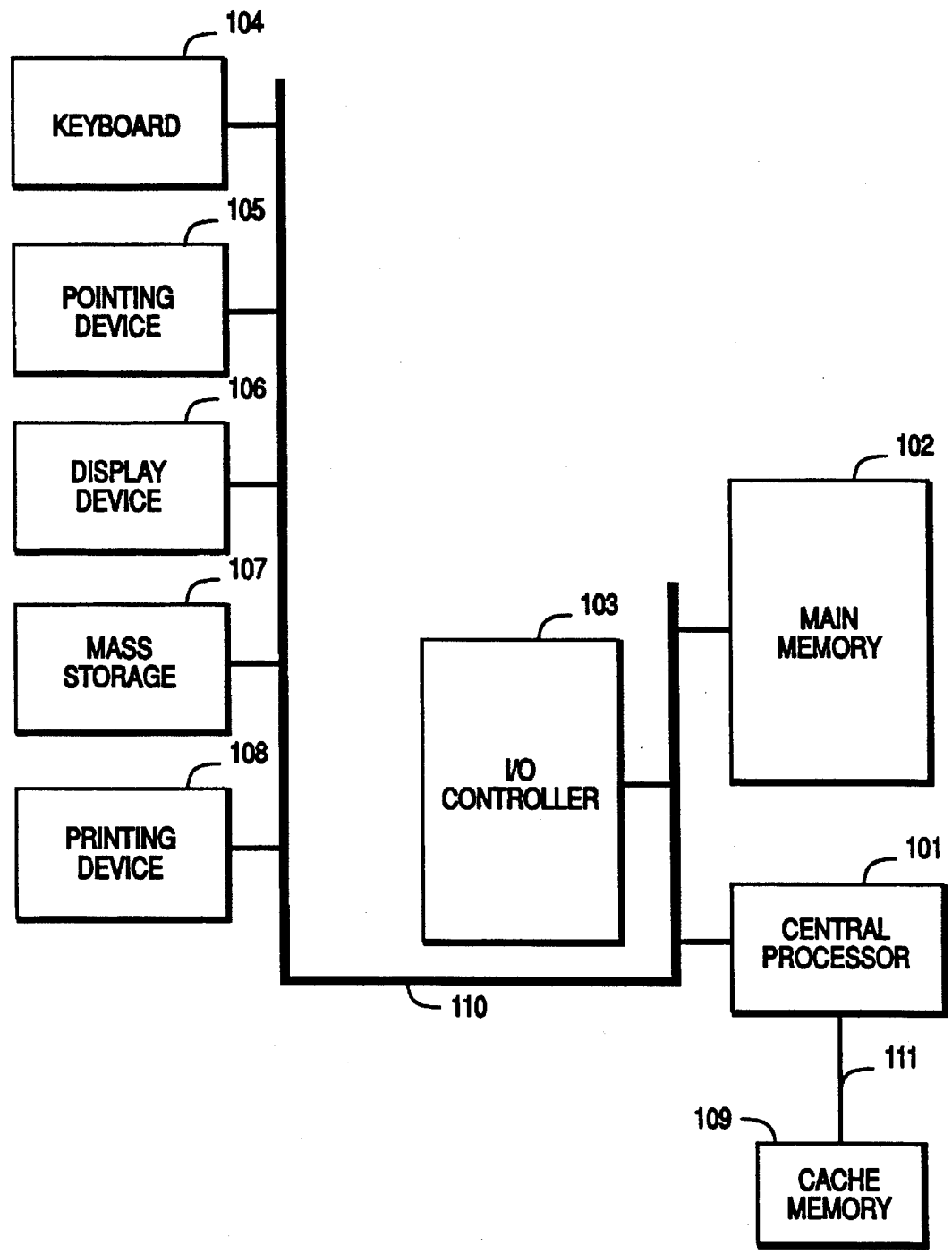
FIG. 1 is a block diagram of a computer system in which the present invention may be embodied.
FIG. 1B is a block diagram of a software system of the present invention, which includes operating system, application software, relational database management system, and user interface components.
FIG. 1C is a diagram illustrating the conceptual relation between a database table and its index.

GLOSSARY access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, which are requested as needed from the operating system.

append: To attach to the end of; this is most often used in reference to writing to a file (adding data to the end of the file).

block (storage block): A group of similar things—usually bytes of storage or data. In disk storage, a block is a collection of consecutive bytes of data that are read from or written to the disk as a group.

database: An organized collection of information.

Database Management System (DBMS): System that controls the organization, storage, and retrieval of information in a database.

directory (and subdirectory): A way of organizing and grouping the files on a disk; typically, presented to the user as a catalog for file names and other directories stored on a disk. What the user views as a directory is supported in the operating system by tables of data, stored on the disk, that contain characteristics associated with each file, as well as the location of the file on the disk.

field: A member of a row that holds a data value associated with an attribute.

file: A conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; it typically includes at least one complete collection of information, such as a program, a set of data used by a program, or the like.

file handle: A "token" (number) that the system uses in referring to an open file. A file handle, like a "CB handle," is a unique identifier.

file name: A file name is a name assigned for identifying a file.

header: Typically the first data in a file, a header stores identity, status, and other data of a file.

index: A stored collection of keys (see below) which facilitate record operations, including searching, inserting, and deleting. Such data structures can include hash tables, binary trees, and B-trees.

input/output: Often abbreviated I/O, input/output refers to the complementary tasks of gathering data for the microprocessor to work with and making the results available to the user through a device such as the display, disk drive, or printer.

location (storage location): The position at which a particular item can be found. A storage location can be an addressed (uniquely numbered) location in memory or it can be a uniquely identified location (sector) on disk.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, such as a disk drive, printer, or memory, that can be allotted to a program or a process while it is running.

row: Physically, a row is usually a record in a data file. Logically, a row is one horizontal member of a table: a collection of fields.

storage device: Any apparatus for recording information in permanent or semipermanent form. Most commonly refers to a disk drive.

table: A structure that contains information. Usually, a collection of rows all stored in one logical file.

write (disk write): To transfer information either to a storage device, such as a disk, or other output device. A disk write transfers information from memory to storage on disk.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, printer 108, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
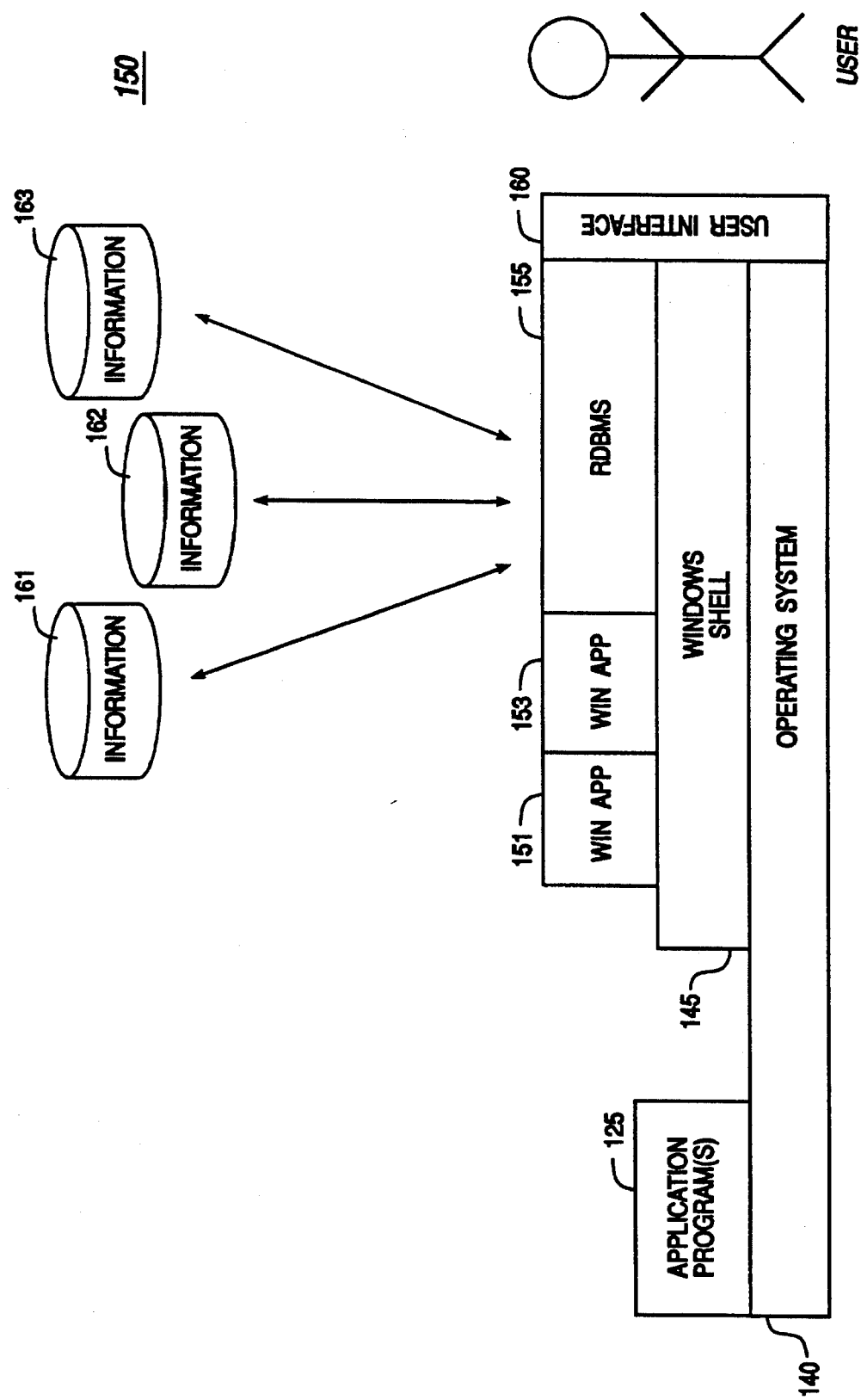

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft® Windows; both are available from Microsoft Corporation of Redmond, Wash. RDBMS 155 includes Paradox® for Windows Database Management System, available from Borland International of Scotts Valley, Calif.

B. Relational Database Management System

RDBMS 155 is a system that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information, such as the information 161, 162, 163 of system 150.

1. Tables

In a relational database management system, information is represented in tables. As conceptually shown in FIG. 1C, a table 170 is organized (logically) into horizontal rows (tuples) 173 and vertical columns 175, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on.

Each field has a field type specifying what sort of information the field can hold and what actions can be performed with that field's data. The system categorizes fields into several types. Each field's type determines the kind of data it contains. Some common field types include alphanumeric (or character), number, date, currency, and memo. System tables also support binary large objects fields, which hold specialized information, such as formatted memos, graphic images, and OLE links.

Internally, tables may be stored by the system as a sequence of fixed-length or variable-length binary records in a single disk file. The system uses a record number as an internal counter to keep track of each record. Between the actual physical database itself (i.e., the data actually stored on a storage device) and the users of the system, therefore, a database management system or DBMS provides a software cushion or layer. Because the DBMS shields the database user from knowing or even caring about underlying hardware-level details, the system manages record numbers automatically, with precautions taken so a user cannot change them directly. Thus, all requests from users for access to the data, including requests to retrieve, add, or remove information from files, are processed by the RDBMS without the user's knowledge of underlying system implementation.

2. Keys

As previously described, every relation (i.e., table) requires a unique, primary key to identify table entries or rows. Thus, a primary key (or just "key") is a field containing data that uniquely identifies each record of a table. In addition to creating a key on just a single field (e.g., key on Last Name), a user may create a "composite key" for a group of fields (e.g., key on Last Name+First Name). Whether a simple or composite key is employed, a key requires a unique value for each record (row) of a table to ensure that a table does not have duplicate records.

Often for a given table, it is possible another set of fields in a table could have been employed as the primary key. All column combinations with unique values form a pool of "candidate keys," from which one is selected as the primary key. The rest remain alternate keys. In SQL and some other databases, candidate keys are generally recognizable because a "unique" index is likely to have been declared upon them. They can (at least in theory) be declared without necessarily having an index. Also, a unique index does not necessarily imply a candidate key; the fields could be only occasionally used and, hence, not valuable as identifiers for the entire table.

A table that has a key defined is said to be a "keyed" table. A table's key establishes the default sort order for the table. The system sorts the table's records based on the values in the field(s) the user defines as the table's key. This makes it easy for the system to find and process records quickly and to preserve the discipline required for a relational table (by not allowing records with duplicate values in the key). In a preferred embodiment, keyed tables are supported internally through use of indexes, which will now be described.

3. Indexes (a) General

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table. One can use an index to view the records in a different order from the default order. However, the records remain stored in the same physical location as they were entered.

Figure 1C:
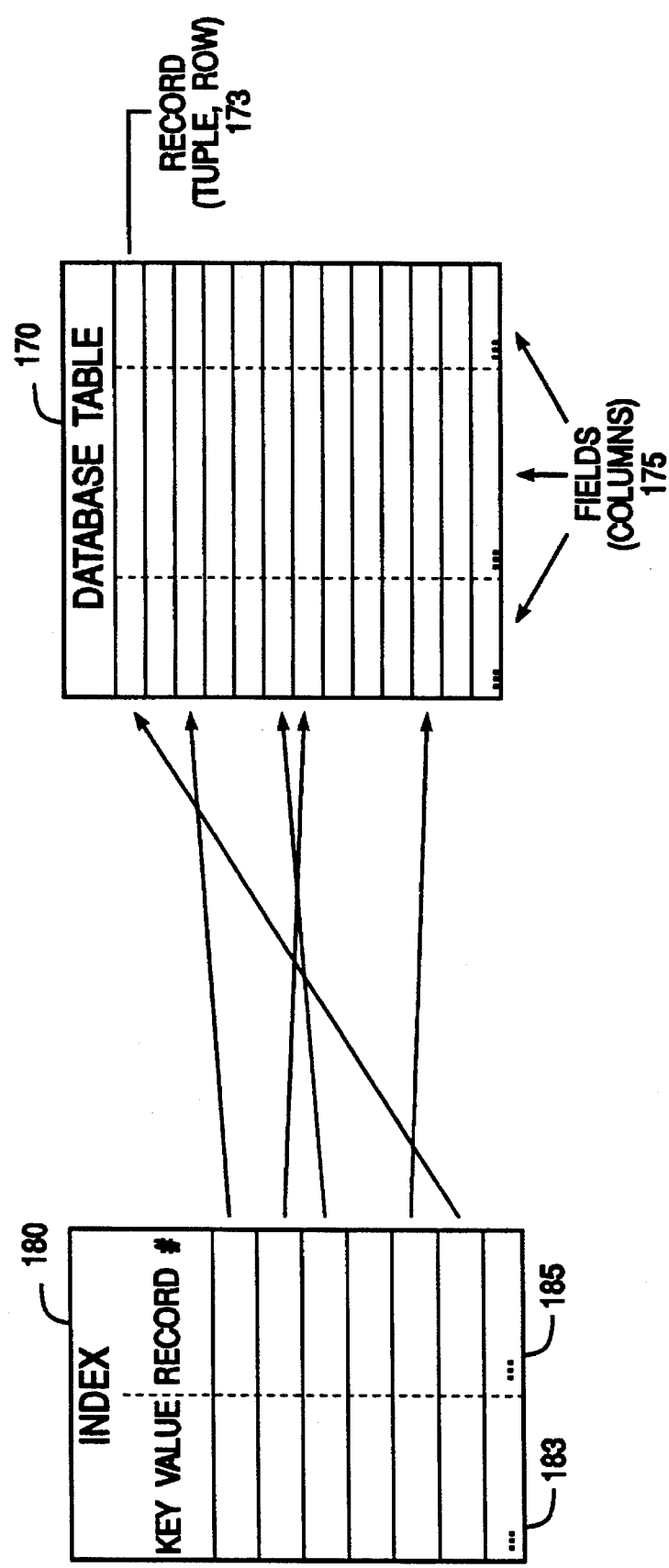

As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records in some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

(b) Primary Index (key)

The system organizes the records of a keyed table according to the values in the field(s) of the table's key. This is its primary index. By default, all indexes organize and access data in ascending order (A to Z or 0 to 9); a different order may be specified by the user if desired. By requesting an index based on a Last Name field of a table, for instance, the user is instructing the system to organize the table by the values in the Last Name field, that is, an alphabetic sort by last name. If, on the other hand, the user prefers to organize the table by first names, he or she can make First Name the primary index, whereupon the system displays the records according to the value in that field. For a composite key, the system organizes the records by the first field of the key (according to the table's structure), then the next field, and so on.

(c) Secondary Indexes

In addition to specifying a primary index or key for a table, the system of the present invention permits the user to specify one or more "secondary indexes" to define alternate view orders for the table. For example, if the user sometimes wants to view a table by First Name values, but needs to keep the table's key order (e.g., Last Name) intact, he or she can create a secondary index on First Name and use it to temporarily change the view order of the records. When the user views a table using a secondary index, the physical location of the records in the table does not change. Secondary indexes can also be used in linking database tables (as described below).

In a preferred embodiment, secondary indexes can be either automatically maintained or non-maintained. (Primary indexes are always maintained.) When the index is maintained, the system updates the index file whenever the user updates the table. A non-maintained index is not automatically updated when the user updates the table, but the user can open a non-maintained index for use on a table. As in the case of composite primary index, the user can create a secondary index on a group of fields, that is, a composite secondary index. In this manner, the secondary index organizes the data by the first field of the index first, then by the second, and so forth.

4. Referential integrity

If data is to be relied upon for decision-making purposes, data integrity should be assured. Referential integrity assures that a field or group of fields in one table (called the "child" or "detail" table) matches the values in the key of another table (called the "parent" or "master" table). The value found in the child table that matches the key of the parent table is called the foreign key.

Referential integrity provides the user with a way of handling changing values in the parent table that affect the foreign keys in all its child tables. Suppose, for instance, that the user has an Orders table with a Customer No field. The user wants to be very sure the value he or she enters in that field represents a customer who can be found (and billed) in his or her Customer table. To ensure this, Customer No in Orders is defined as a foreign key pointing to Customer. Then, each time the user enters a value in the Customer No field of Orders, the system checks the Customer No field of Customer to make sure the entry is valid.

The system also provides for cascading updates. Suppose the user needs to change a value in a parent table's key. Referential integrity gives the user a way to make the same change in all matching foreign key records of the child table. Using the example of Customer and Orders, suppose the user changes the Customer No value of a record in Customer. Unless one uses referential integrity, all records in the child table (Orders) that belonged to the parent record become orphaned—they are no longer associated with a valid record in Customer. Using referential integrity, the system can cascade the change from Customer to Orders. The system finds all records in Orders that match the changed value in Customer's key and changes them to the new value.

C. Graphical User (Windowing) Interface

1. System UI

Figure 2:
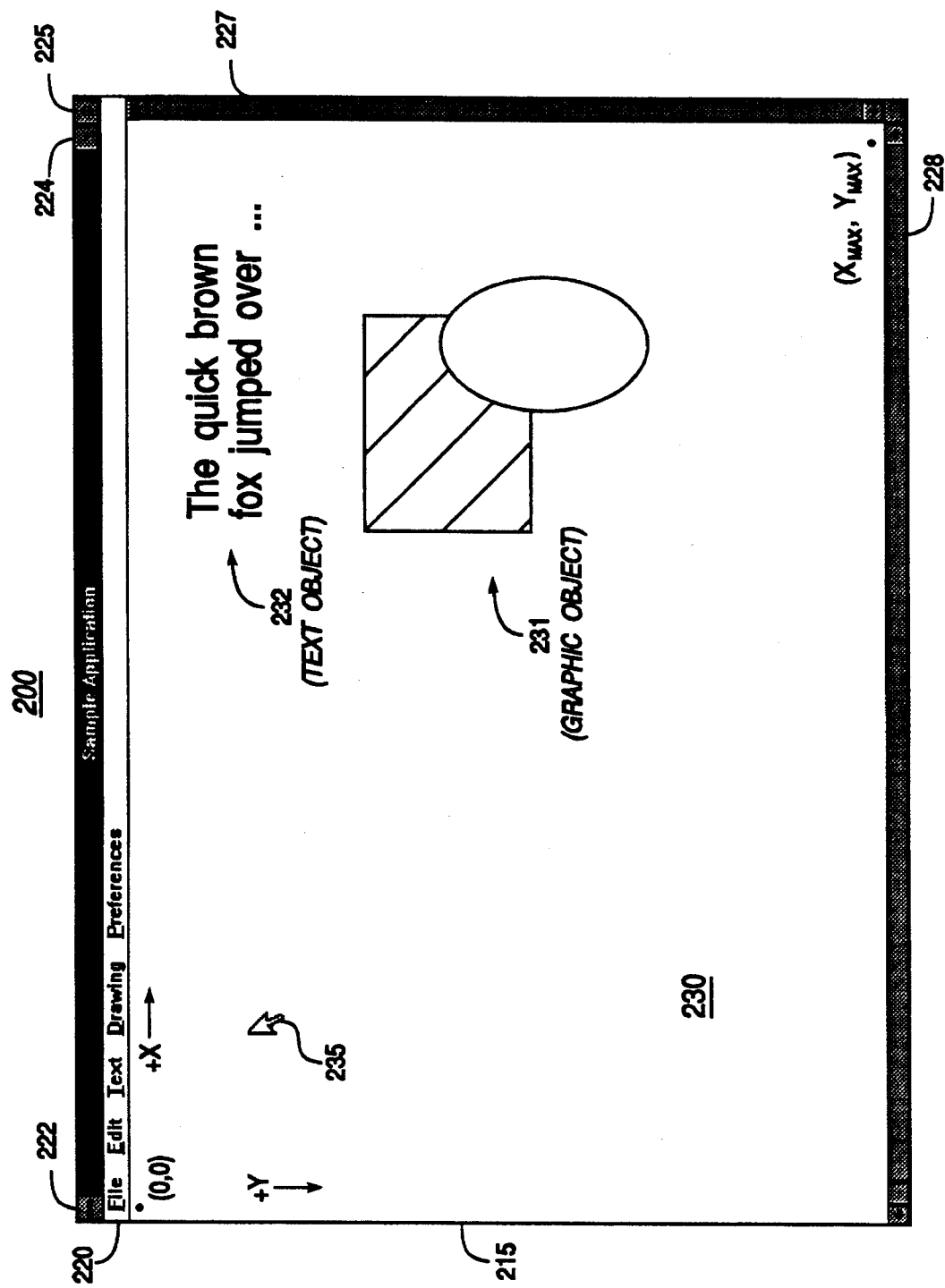
FIG. 2 is a bitmap screenshot illustrating the basic architecture and functionality of a graphical user interface in which the present invention may be embodied.

As shown in FIG. 2, the system 100 typically presents User Interface (UI) 160 as a windowing interface or workspace 200. Window 200 is a rectangular, graphical user interface (GUI) for display on screen 106; additional windowing elements may be displayed in various sizes and formats (e.g., tiled or cascaded), as desired. At the top of window 200 is a menu bar 220 with a plurality of user-command choices, each of which may invoke additional submenus and software tools for use with application objects. Window 200 includes a client area 230 for displaying and manipulating screen objects, such as graphic object 231 and text object 232. In essence, the client area is a workspace or viewport for the user to interact with data objects which reside within the computer system 100.

Windowing interface 200 includes a screen cursor or pointer 235 for selecting and otherwise invoking screen objects of interest. In response to user movement signals from the pointing device 105, the cursor 235 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 200 may be closed, resized, or scrolled by "clicking on" (selecting) screen components 222, 224/5, and 227/8, respectively. Keystroke equivalents, including keyboard accelerators or "hot keys", are provided for performing these and other user operations through keyboard 104.

In a preferred embodiment, GUI 200 is embodied in a message-based windowing environment. The general methodology for creating windowing interfaces and for retrieving and dispatching messages in an event-based GUI system, such as Microsoft Windows, is known in the art; see, e.g., Petzold, C., Programming Windows, Second Edition, Microsoft Press, 1990. Additional information can be found in Microsoft's Window Software Development Kit, including: 1) Guide to Programming, 2) Reference, Vols. 1 and 2, and 3) Tools, all available from Microsoft Corp. of Redmond, Wash. The disclosures of each of the foregoing are hereby incorporated by reference.

2. Desktop UI

Figure 3A:
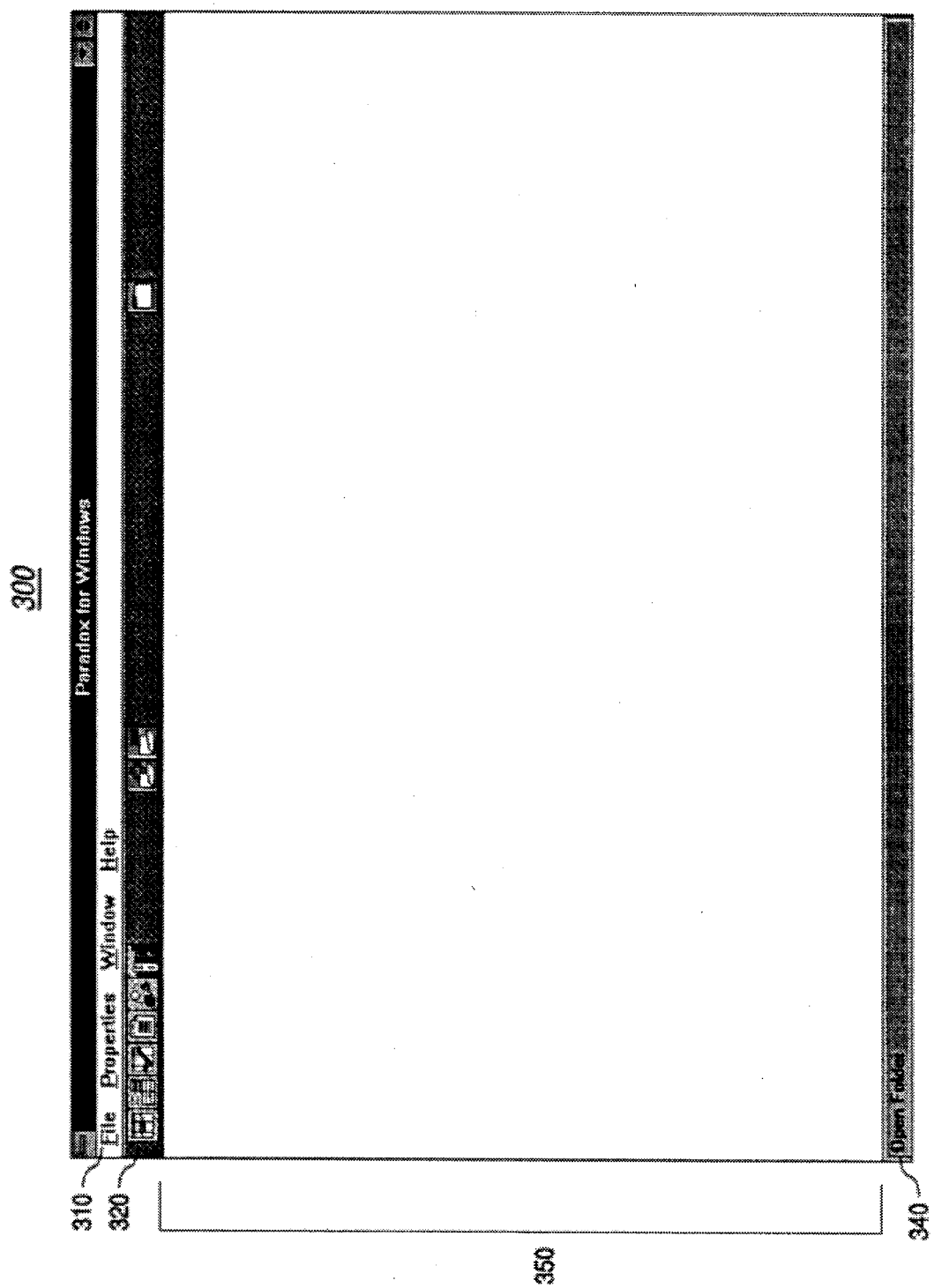
FIG. 3A is a bitmap screenshot illustrating a preferred Desktop or application interface for the system of the present invention.

In addition to the general windowing interface 200 for system 100, a preferred application interface is provided for RDBMS 155. When one starts the RDBMS system, a Desktop interface 300 first appears in display 106, as shown in FIG. 3A. The Desktop is the central working area in the system and serves as a "parent" window to all windows that appear in the system. It is where the user initiates all tasks. All windows are opened on the Desktop and are contained by the Desktop. Using the Desktop, the user can create and modify objects, set preferences, open and close files, and the like.

The Desktop may be divided into functional regions which include a main menu 310, a toolbar 320, a client area 350, and a status line 340. The menu bar 310 contains commands the user can choose to open windows, configure his or her Desktop, and work with his or her data. The menu bar is context sensitive, that is, it contains only the menus one needs at the moment. If a menu is not appropriate for a given task, it does not appear on the menu bar.

Figure 3B:
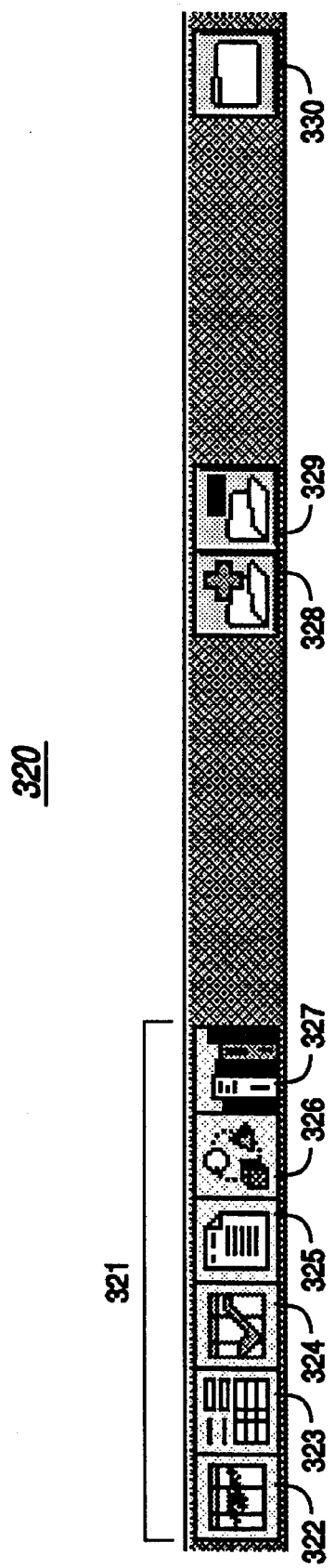
FIG. 3B is an enlarged view of a toolbar from the interface of FIG. 3A.

The toolbar 320 contains shortcut buttons 321 for common menu commands. The toolbar 320, shown in further detail in FIG. 3B, comprises a row or palette of tools which provide a quick way for the user to choose commonly-used menu commands or properties. Like the menu bar, the toolbar buttons change as different windows are opened. To choose a toolbar button, one selects (clicks) it with the mouse. In an exemplary embodiment, the Desktop toolbar 320 includes Open Table 322, Open Form 323, Open Query 324, Open Script 325, Open Report 326, Open Library 327, Add Folder Item 328, Remove Folder Item 329, and Open Folder 330 tools. The same actions are also available as corresponding commands in menus (available from menu bar 220).

The status bar 340 gives a user information about the task he or she is working on and the current state of the system. Like the menu bar and the toolbar, the appearance of the status bar changes as one works. As with the interface 200, standard Windows controls, like the title bar, the borders, the Control menu, the Maximize button, and the Minimize button are provided to let a user control the shape, size, and position of the Desktop.

Desktop 300 includes a client area 350, which functions in a fashion similar to that for the above-described Windows interface 200 (in FIG. 2) for displaying and manipulating screen objects of interest. In addition to simple text and graphic objects, the system provides the user with a set of sophisticated objects for storing and presenting his or her data. These will now be described in turn.

3. System Objects (a) Tables and Design Documents

Figure 3C:
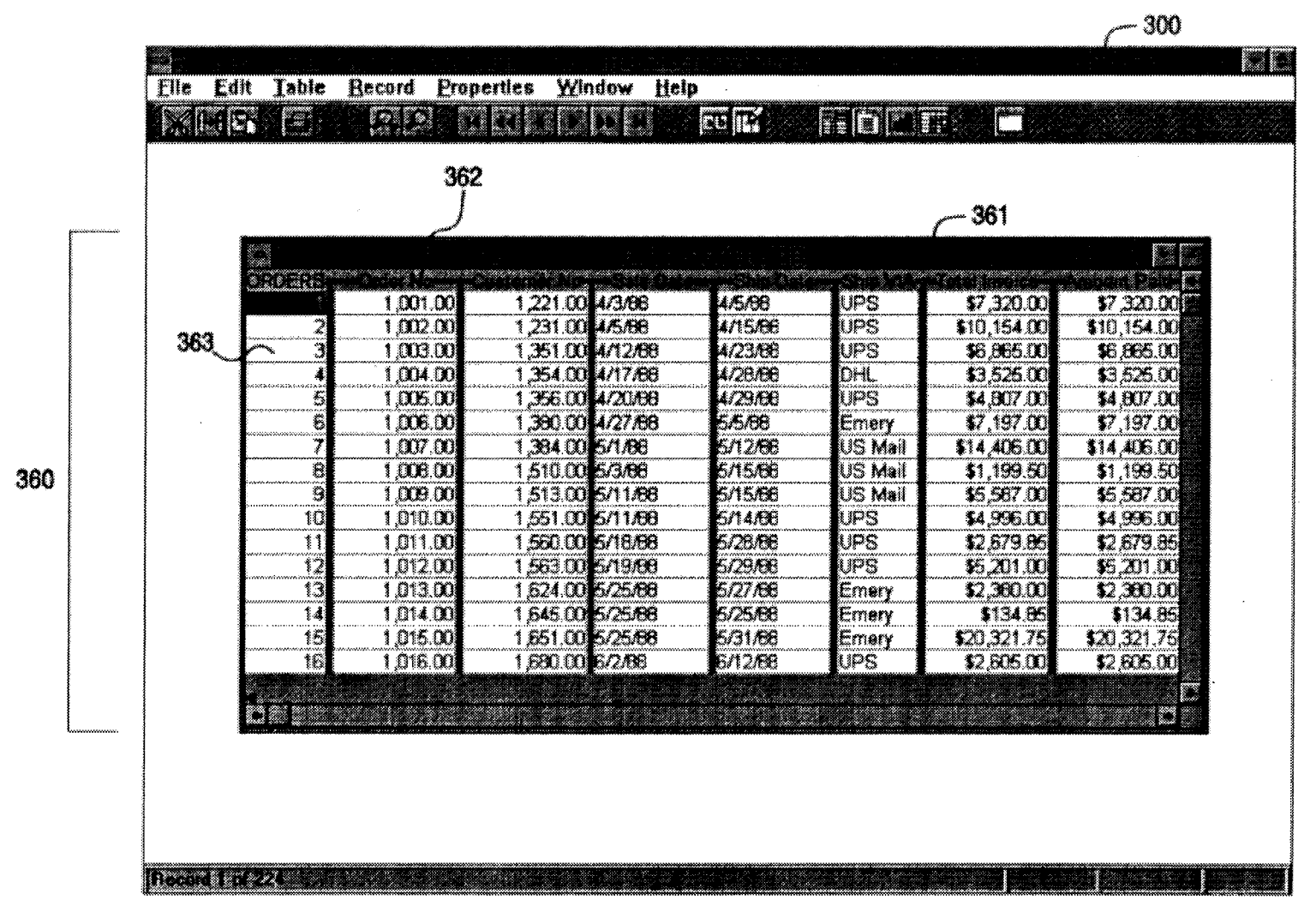
Figure 3D:
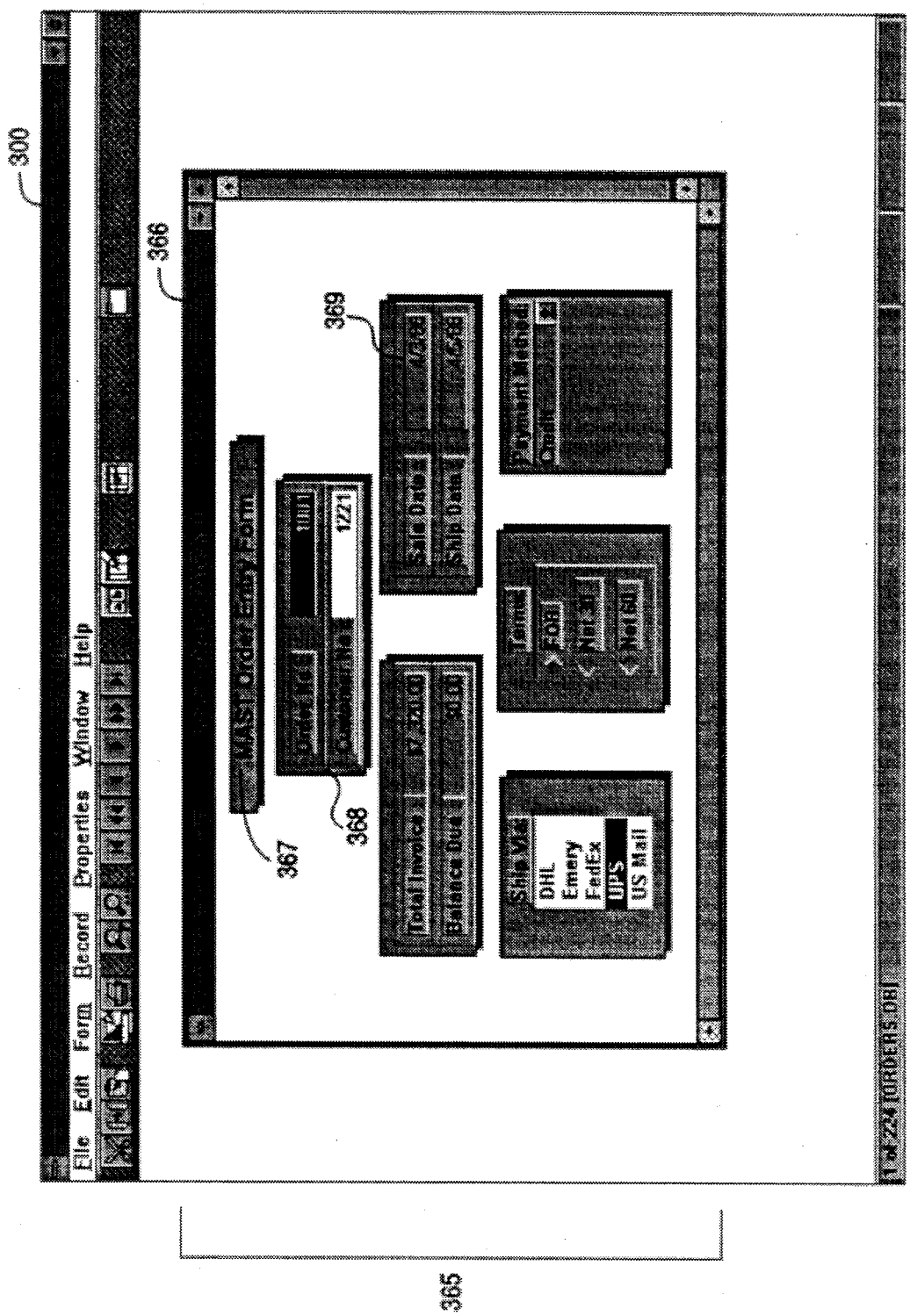
Figure 3E:
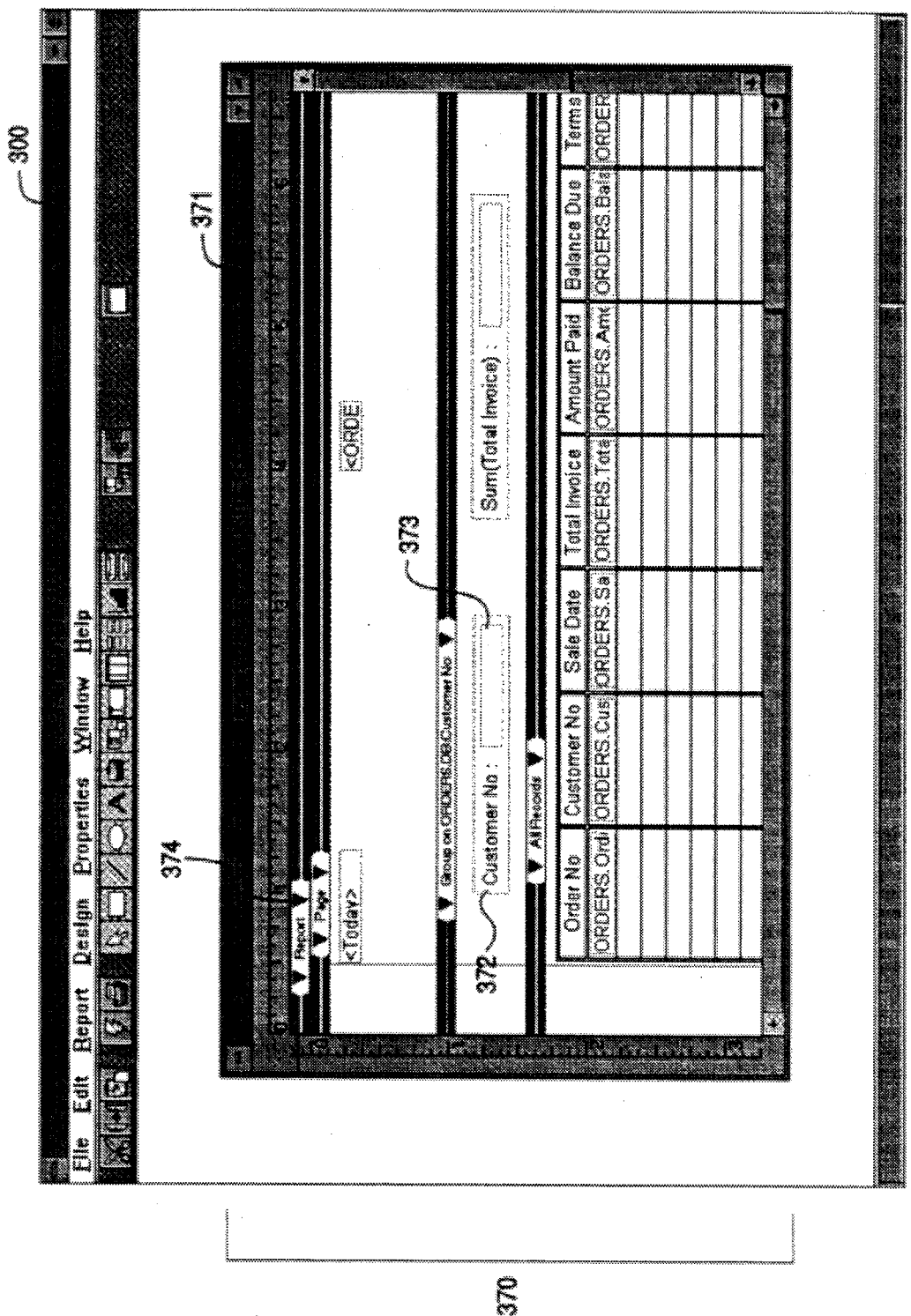

The system provides a set of objects including table, form, report, query, script, and library objects. As shown in FIGS. 3C–E, each type of major object in the system appears in its own type of window within the client area 350 and is itself comprised of objects. Table 361, for example, appears in a Table window 360; it comprises row and column objects 362,363. Form 366 appears in a Form window 365 and includes (among other objects) an edit field object 369, a box object 368, and a text object 367. Similarly, Report 371 appears in a Report window 370 and includes, for instance, a report band object 374, a field object 372, and an edit field 373 (contained within the object 372). Each type of window includes specialized commands and functions that apply only to that type.

The Desktop 300 contains all windows; here, the commands and functions of the Desktop remain available to all the objects. Once one learns to work with one type of object, he or she can work with similar objects. For example, when the user knows how to edit tables using Table windows, he or she can also edit tables using Form windows. When one knows how to design forms, he or she has the basics of designing reports.

While tables (e.g., Table 361) are the objects that users will use the most in the system, users will often want to display information in a format which is not tabular. For this purpose, the system provides "design document" objects. Form 366 and Report 371 are design documents for instance. Each allows the user to customize how the user's data are presented.

The system of the present invention provides forms and reports as design documents that can present a user's data in a variety of formats. For instance, a user can create design documents that display one record at a time, display multiple records at a time, display only certain fields of a table, display design features (e.g., lines, boxes, graphic images, shading, or special colors), and the like. Design documents can also link together different tables, so that information stored in separate tables appears to the user to come from one place.

Forms and reports differ as follows. Forms are editing tools which let the user display and edit data in his or her tables. The user can, for example, create forms that add data to several tables at once. Reports, on the other hand, are printing tools. They allow the user to format and print his or her data. A user can, for example, use reports to create form letters, mailing labels, invoices, and the like. Unlike forms, reports cannot change the data in a user's table (though they can change the way his or her data appears on a final report).

To create a new design document, the user proceeds as follows. First, the user opens a design window for the type of document desired. For a form object, for instance, the user would open a form window (e.g., Form Window 362). Next, the user places the objects he or she needs on the document. Finally, the user changes the property of the objects on the document until they appear as desired.

Underlying the design document is one or more tables that contains the data which the user wishes displayed on screen or printed in a report. Thus, the task of creating a design document is one of choosing the table (or tables) that contains the data desired; defining the relationships between tables (in the instance of a multi-table design document), specifying the fields desired to be displayed in the design; and choosing an initial design layout for the document.

(b) Creating tables

The creation of information tables and design documents will be illustrated for a small sales order-management database, which is sophisticated enough to demonstrate the elements of creating a relational model, but is sufficiently simple for clarity. The database includes a plurality of information tables 375 as shown in FIG. 3F. It includes a Customer table (CUSTOMER.DB) for storing customer data, and includes an Orders table (ORDERS.DB) for storing information about each order made by a customer. As shown, each of these two tables includes a common field: Customer No. The two tables may, therefore, be linked through this common field. Moreover, to maintain integrity of the Orders table, no order should be accepted for a customer which does not exist; in other words, the Orders table is preferably dependent on the Customer table (in a child-to-parent or detail-to-master relation).

Just as the Orders table may depend from the Customer table, the Orders table itself may have several tables depend from it. Thus, as shown in FIG. 3F, the database also includes a Line Item table (LINEITEM.DB), a Stock table (STOCK.DB), and a Vendors table (VENDORS.DB). The Line Item table serves to store each line of information of each order; thus, each entry in the Line Item table references the Orders table through a common field, the Order No. Each entry in the Line Item table includes a Stock No, thus referencing an entry in the Stock table. Each entry in the Stock table includes a Vendor No, for referencing a particular entry in the Vendors table.

Figure 3G:
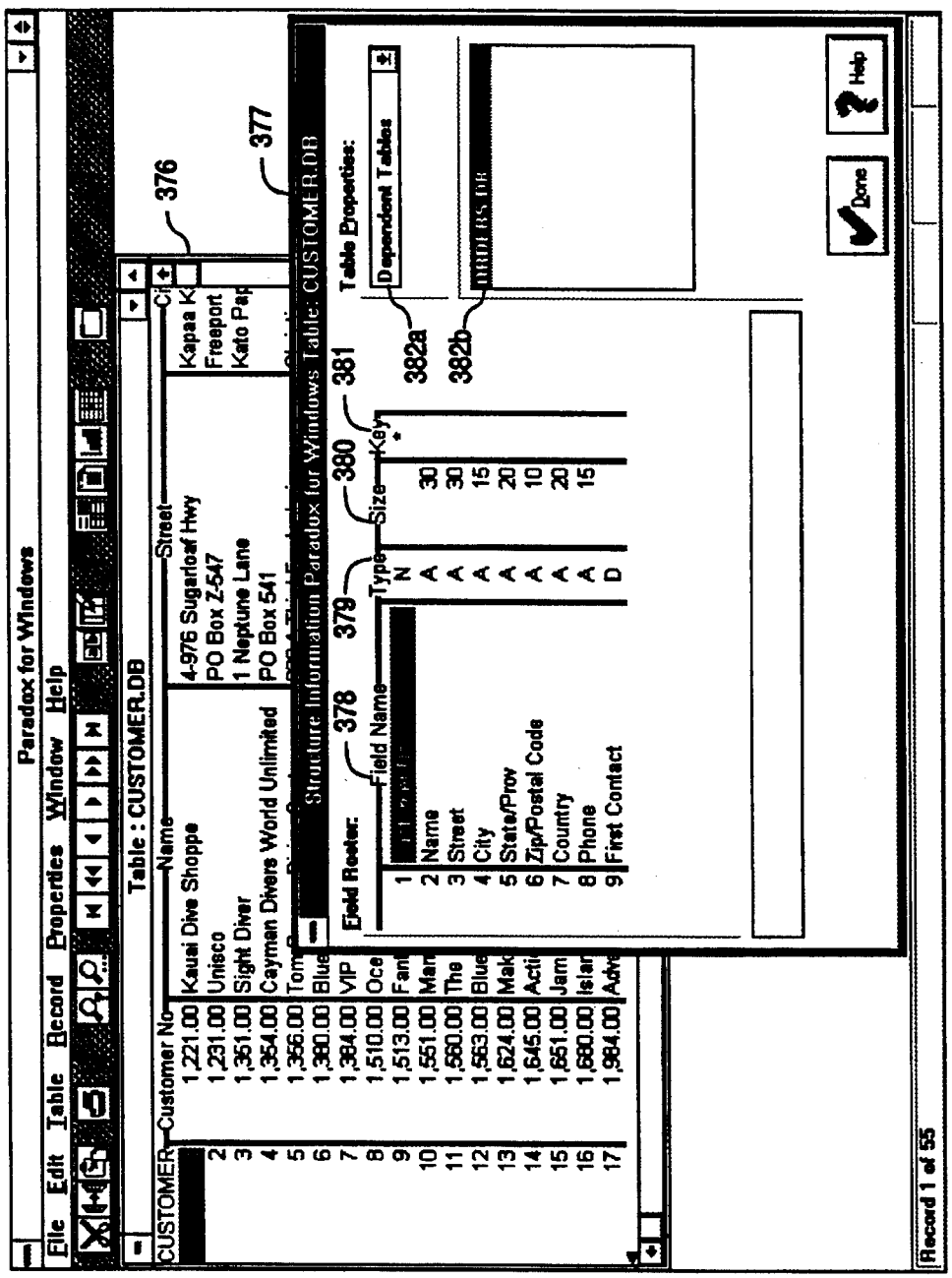

To create these tables, the user specifies a structure for each. The structure includes information about the name of each field, its type, and its size (if necessary). As shown for the Customer table 376 of FIG. 3G, for instance, the table has been defined with a structure as shown by the structure information dialog 377. Each field has been given a field name 378, a type 379, and a size 380 (if necessary). In addition, the user may select one or more fields to serve as a key 381 (or no fields in the instance of an unkeyed table). Also shown, the dialog 377 includes a table properties list 382a. With the property list set to show dependent tables, a display list 382b indicates that the Orders table is dependent upon the Customer table (as will be described in further detail).

Figure 3H:
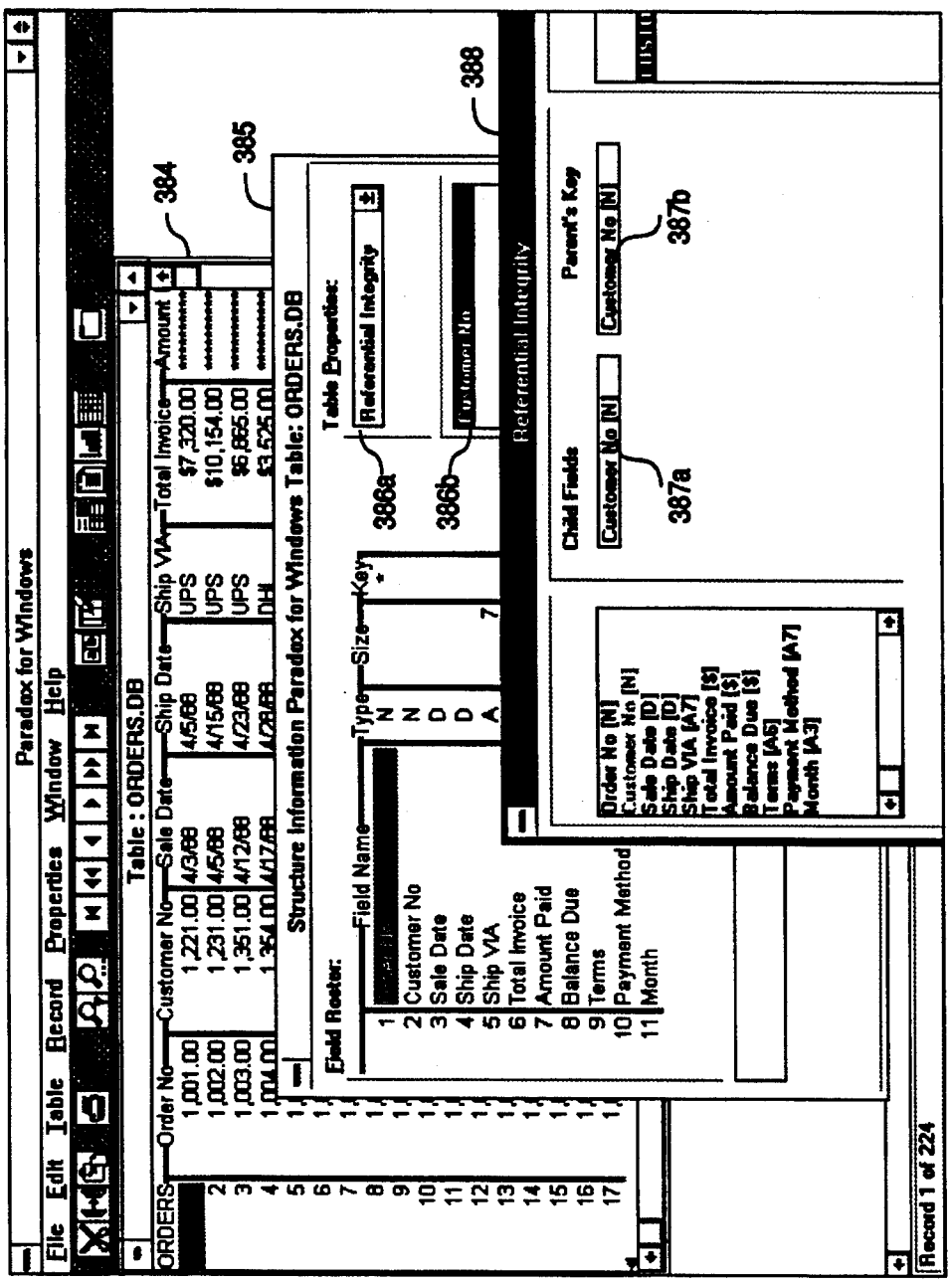
Figure 31:
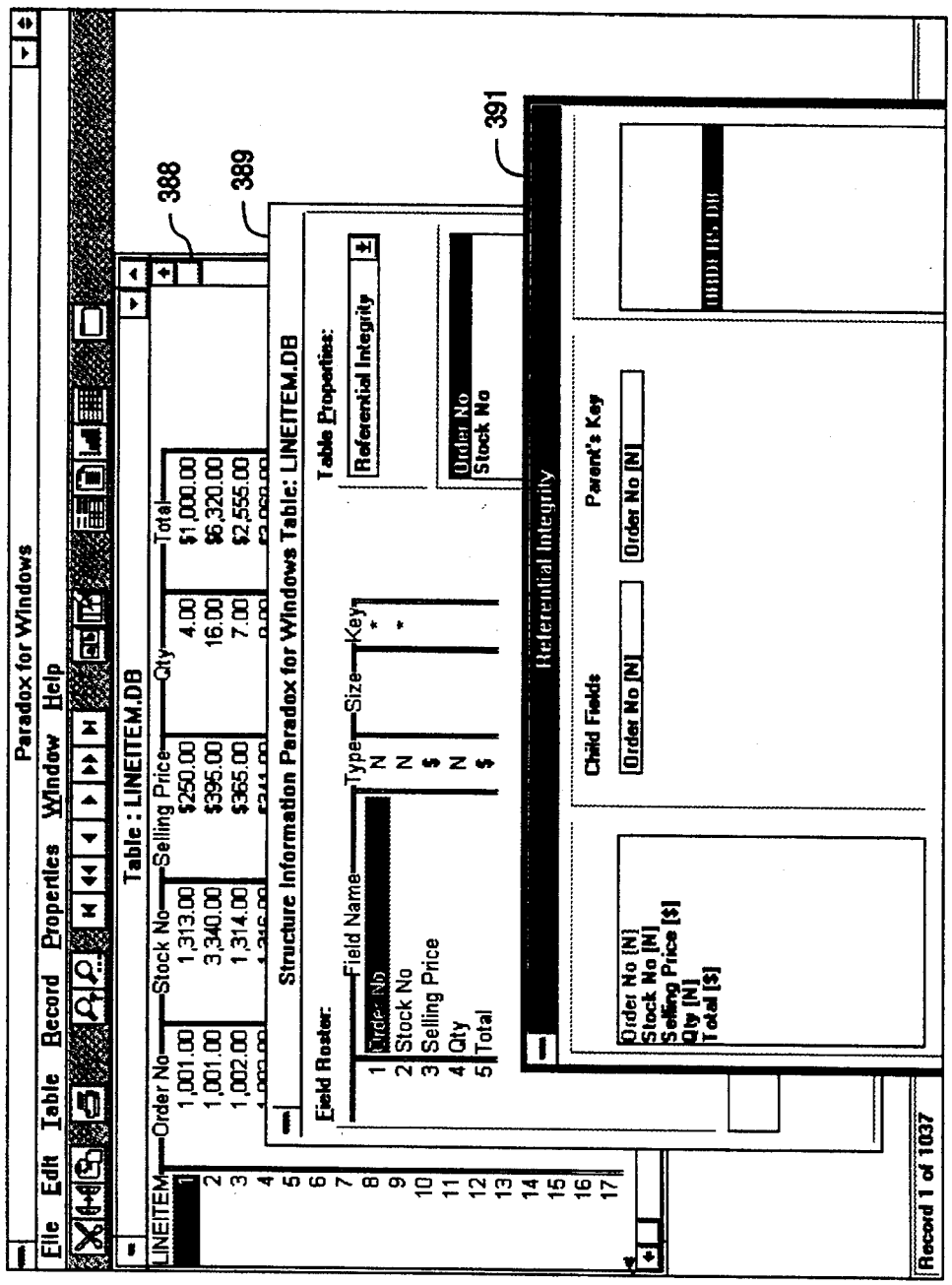

The structure for the Orders table 384 is shown in structure information dialog 385 of FIG. 3H. As before, appropriate information has been entered for field name, type, and size. Also shown, the table has been keyed by Order No. From the table properties list 386a, the user has specified a referential integrity check for the Customer No field (which now appears also in the list 386b). In response to the request, the system displays a referential integrity dialog 388. As shown by the child fields list 387a, the user has selected the Customer No field from the Orders table 384 to match a parent's key of Customer No (shown in a parent's key list 387b), thus linking the Orders table 384 to the Customer table 376.

Figure 3J:
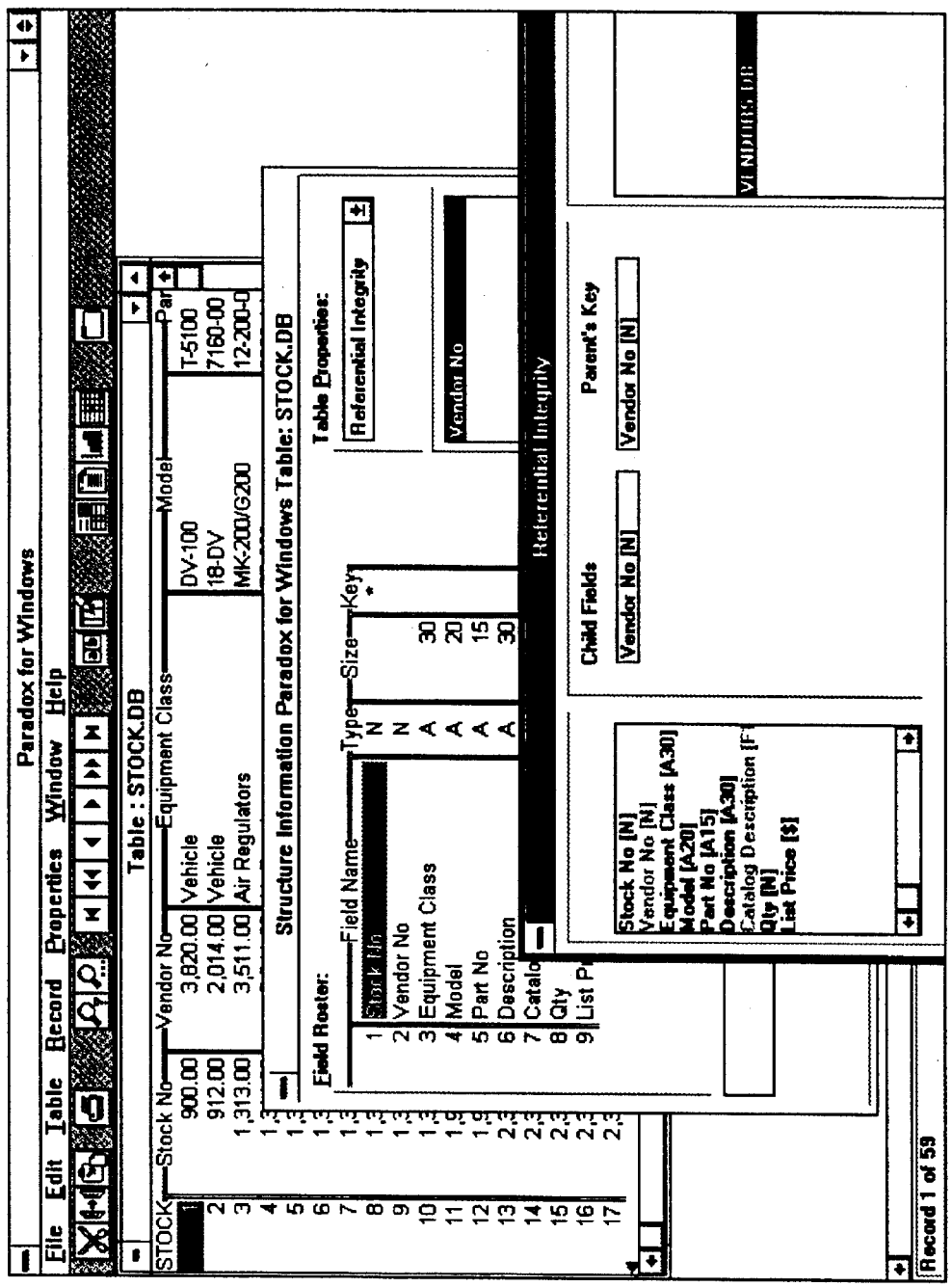
Figure 3K:
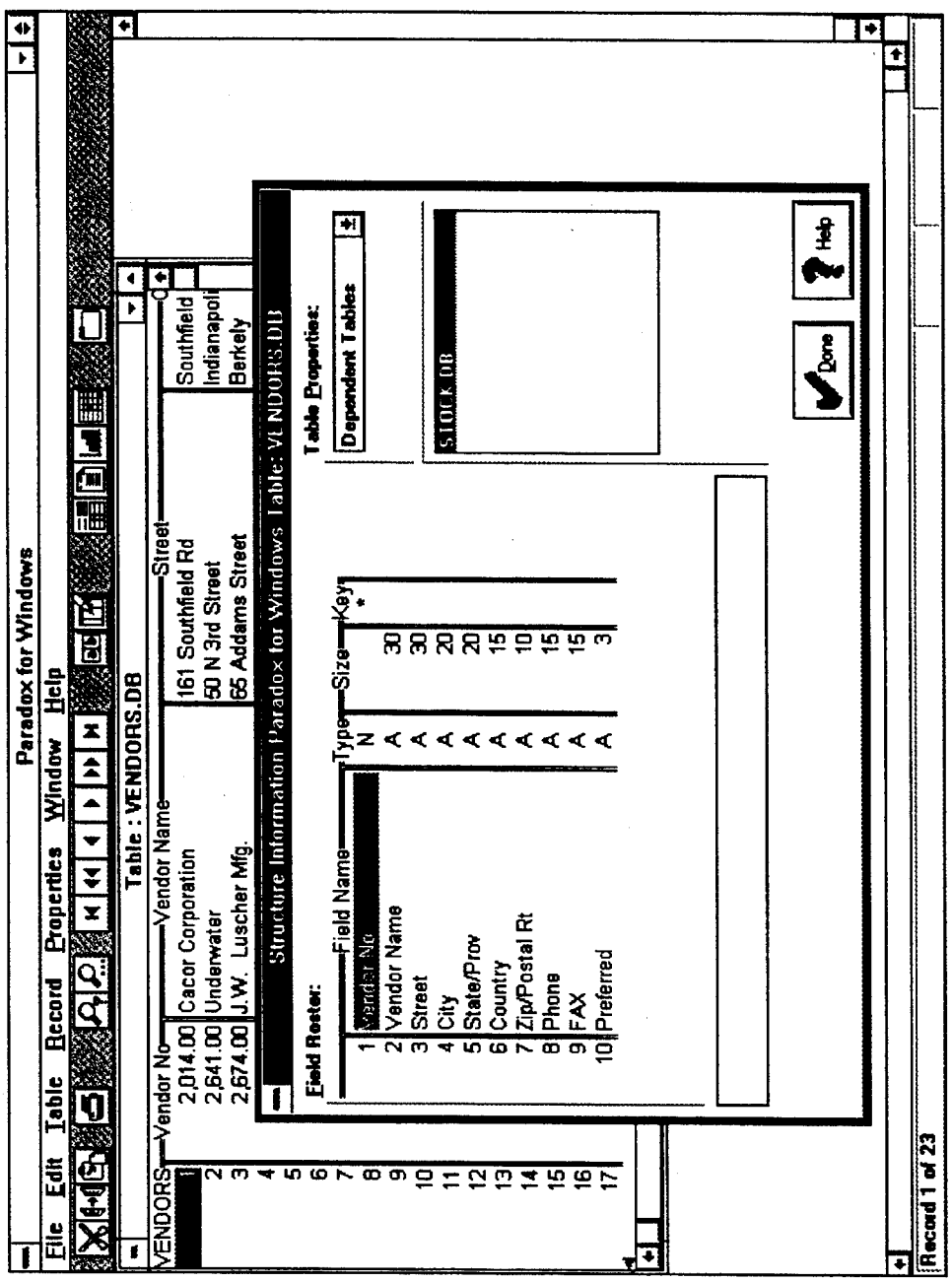

As shown in 3I–K, Line Item, Stock, and Vendors tables are structured in a like manner. Line Item table 388 includes a structure as shown in dialog 389, with referential integrity checks defined on its Order No and Stock No fields (e.g., the Order No field is linked to the Orders table as shown in the referential integrity dialog 391). Structures for the Stock and Vendors tables are shown in FIGS. 3J and 3K, respectively.

Relational Database Information Storage and Retrieval

A. Unique Field IDs

Figure 4:
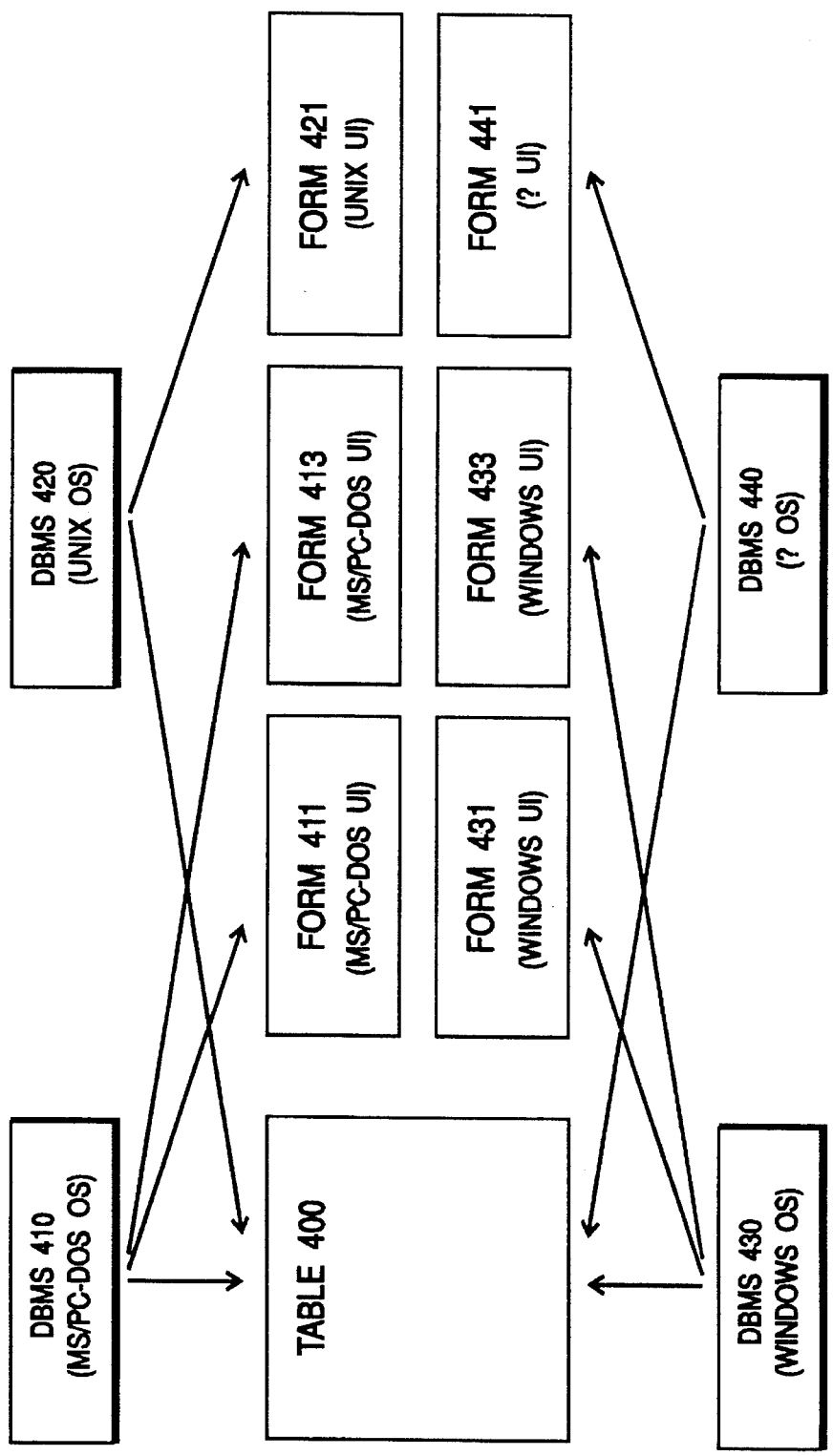
FIG. 4 is a block diagram illustrating the relationship between an information table (e.g., stored at a logical location) and multiple design documents (e.g., forms) which depend on the information table, each design document optimized for a particular operating system user interface.

As shown in FIG. 4, a given information table, such as information table 400, may be shared by several disparate DBMS systems ("clients") operating on different operating systems. For instance, the table 400 may be shared by MS-DOS DBMS 410, UNIX DBMS 420, Windows DBMS 430, and other (unknown) DBMSs (e.g., DBMS 440). Thus, the table 400 may reside at a logical storage location which is available to numerous client DBMS systems, each of which runs on a specific platform.

Although the table 400 may be stored in a fashion which minimizes platform-specific constraints, design documents (e.g., forms and reports), on the other hand, typically must include information for a specific platform. Design documents, if they are well designed, take full advantage of the features available for a given platform. Thus DBMS 430, for instance, stores forms 431, 433 which include features optimized for the target operating system's user interface. The Windows forms 431, 433 include design objects which make particular use of the features of the Windows user interface. In a similar manner, UNIX DBMS 420 employs a form (form 421) which relies on features of the UNIX interface (as provided, for example, through X-Windows). Thus, data may be stored and maintained centrally on the one hand; individual DBMS clients may display that information to the user in a manner optimized for the target platform/operating system on the other hand.

A distinct problem may occur with the configuration of FIG. 4. Specifically, each of the forms 411, 413, 421, 431, 433, 441 is created based on a particular structure (design and layout) of the table 400 in existence at the time the form is created. The form 421, for instance, may include a Customer No. data entry field which is linked directly to a Customer No. field of the table 400. If any one of the other DBMS clients "restructures" the table 400 to change the Customer No. field, then the form 421 must somehow correctly identify the modified table field which results (so that the link between the field on the form and the field in the table are maintained). This problem will be further illustrated in FIGS. 5A–D.

Figure 5B:
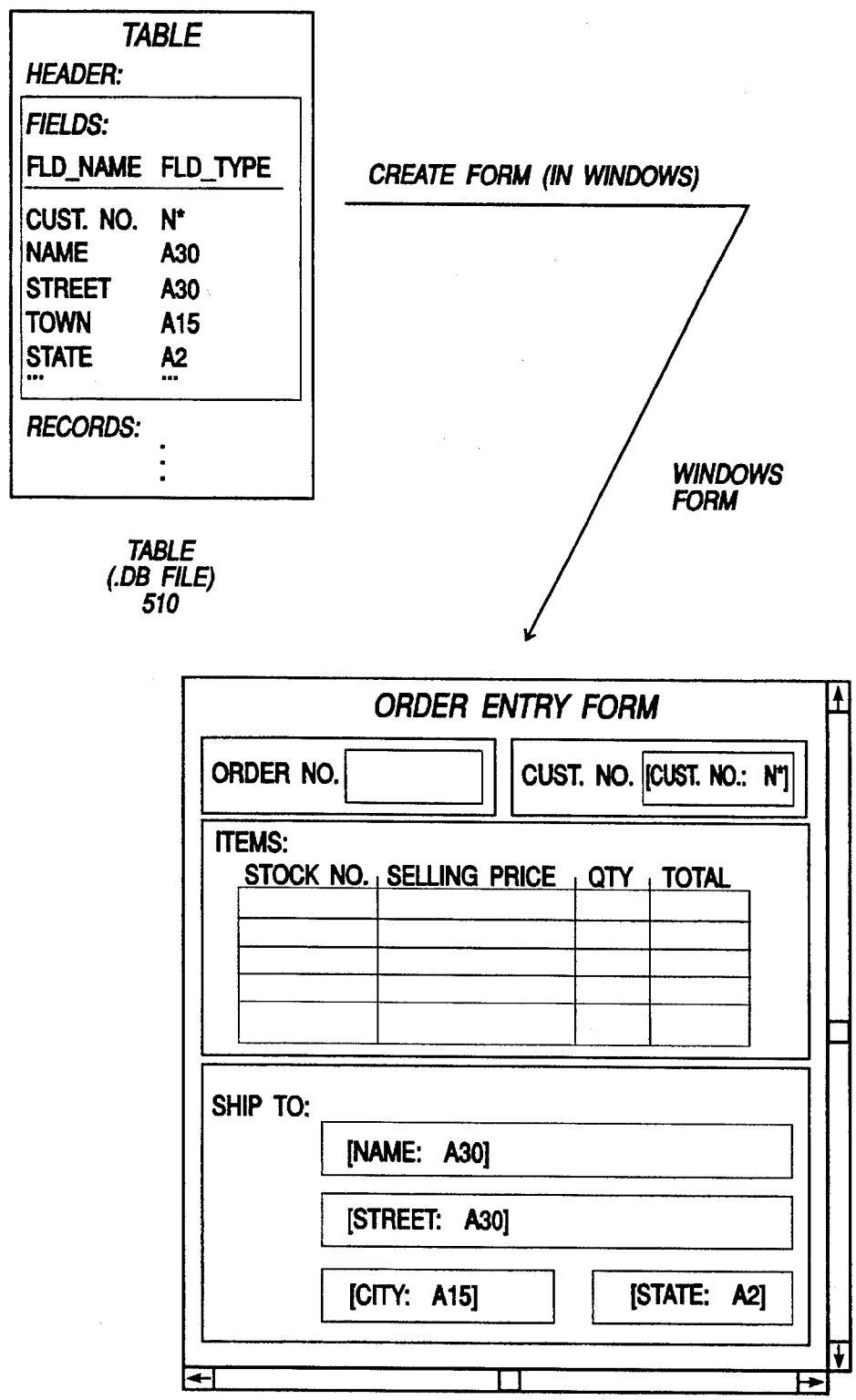
FIG. 5B is a diagram illustrating the creation of a second form from the table of FIG. 5A, the second form being optimized for a particular user interface (e.g., Windows).

As shown in FIG. 5A, a customer table 510 has been created for storing customer information. The table includes as its first field a Cust. No., which serves as the primary key for the table. This is followed by other relevant fields: a Name field (30 alphanumeric characters), a Street field (30 alphanumeric characters), a City field (15 alphanumeric characters), a State field (2 alphanumeric characters), and so forth. From the table 510, the user may create a New Customer Form 520 for display on the screen device of an MS-DOS based system. In a similar manner, this or another user may create an Order Entry Form 530 from the table 510 for a Windows-based system, as shown in FIG. 5B. Again, the form includes field objects which are linked to corresponding fields of the table 510.

Continuing with the example, suppose that the MS-DOS user desires a new form 521 (shown in FIG. 5C) and in the process of creating the form restructures the table 510. As shown, the form now includes a new field 523 for storing gender or sex information. Also, the user has increased the width of the Address data entry field 525 from 30 alphanumeric characters to 240 alphanumeric characters. To support the changes to the form 521, the user has restructured table 510 to form new table 511 as follows. The user has inserted a new Sex table field 513 and modified the Street table field 515 to increase its storage width. The user has also renamed the City field to "Town" field 517. Although the latter change was not necessary for the new form 521, the change is included to illustrate that users will often restructure a table by changing the name of fields (to ones which they prefer).

Although the restructure changes to the table effected by the MS-DOS user (using the MS-DOS DBMS client) are consonant with changes to the MS-DOS form 521, the changes lead to inconsistencies between the table and other forms (running under different operating systems) which depend on that table. As shown by the Windows form 530 in FIG. 5D, for instance, two data entry fields of the form (fields 535, 536) reference fields of the table which no longer exist, at least in their original form. Data entry field 535 was linked to the third field of the table 510. Because a new field (Sex field) was inserted, however, the third field is now a different field (i.e., the Name field). The data entry field 535 cannot be simply matched to the corresponding table field merely by field name and/or field type. As shown in the figure, the field which was the third table field, with the name of "Street" and field type of 30 alphanumeric characters, is now the fourth field of the table, with a different field name and a different field type. Similarly, the table field corresponding to the data entry field 536 has changed in relative location and field name. Despite these changes to field names, the data itself (i.e., the information stored in the records of the table) remains unchanged (except when a field is deleted, or changed to a field type which is incompatible with its previous type). Thus as shown above, a restructuring operation of a data table by a particular client may lead to inconsistencies between the table and forms and reports of other clients (that are operating under different operating systems) which depend on that table.

Figure 6A:
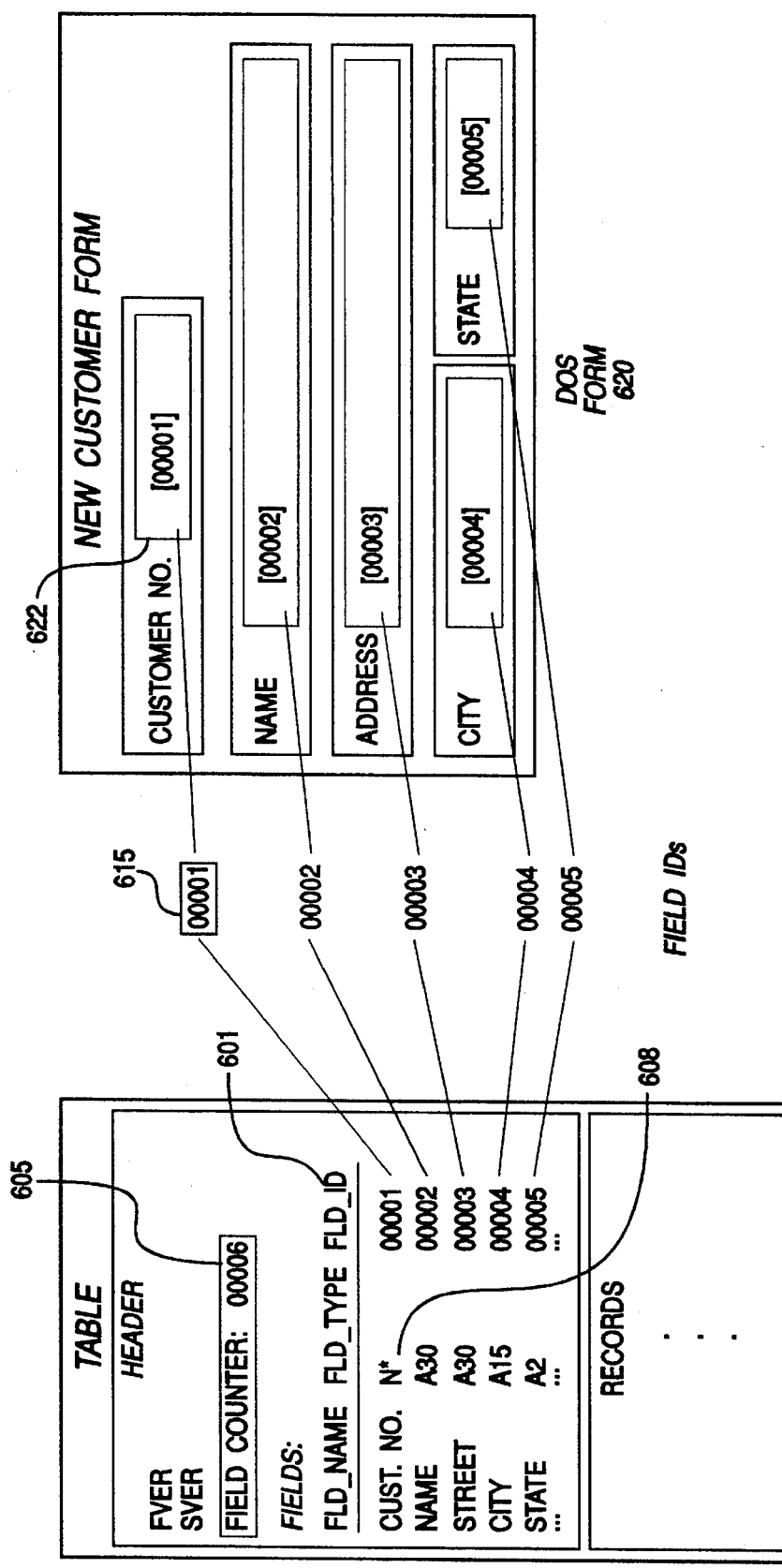

Referring now to FIGS. 6A–D, a method of the present invention for maintaining integrity between information tables which may be restructured and their corresponding forms and reports will be illustrated. As shown in FIG. 6A, an information table, such as table 610, created in the system of the present invention includes field identifiers or IDs 601. The field IDs function as follows. Upon creation, each field receives a unique field ID, in addition to the field name and field type it receives. The field ID for the field provides a unique identifier for the field regardless of changes to the field's name or type. In essence, a field ID will "follow" its field despite the many changes which may occur.

As shown in FIG. 6A, a unique field ID may be obtained from a field counter 605, which is preferably maintained in a header to the table and is incremented with each new field created. In this manner, each new table field is assigned or "branded" with a unique identifier. In a preferred embodiment, a field ID is a 16-bit quantity, thus allowing $2^{16}$ or 64K unique fields. Those skilled in the art will appreciate that a field ID in accordance with the present invention may include other data members, such as a 32-bit or 64-bit number. Also, a time/date stamp (e.g., system maintained long integer quantity) may be employed to generate unique identifiers—signatures which may be employed for determining whether a particular table and family members "belong" together.

The foregoing restructuring example of FIG. 5 will now be examined using field IDs of the present invention. As shown in FIG. 6A, as MS-DOS form 620 is created, each of its data entry fields receives the field ID of its corresponding table field. The Customer No. data entry field 622, for example, receives field ID 615—the unique identifier for the Customer No. field 608. Other data entry fields of the form receive corresponding field IDs of their respective table fields, as shown. In a like manner, the data entry fields of Windows form 630 receive the unique field IDs identifying their respective table fields, as shown in FIG. 6B. Although not shown, each form or report may include a list of tables from which it depends; each field ID of the form or report is associated with a particular target table of the list.

Figure 5D:
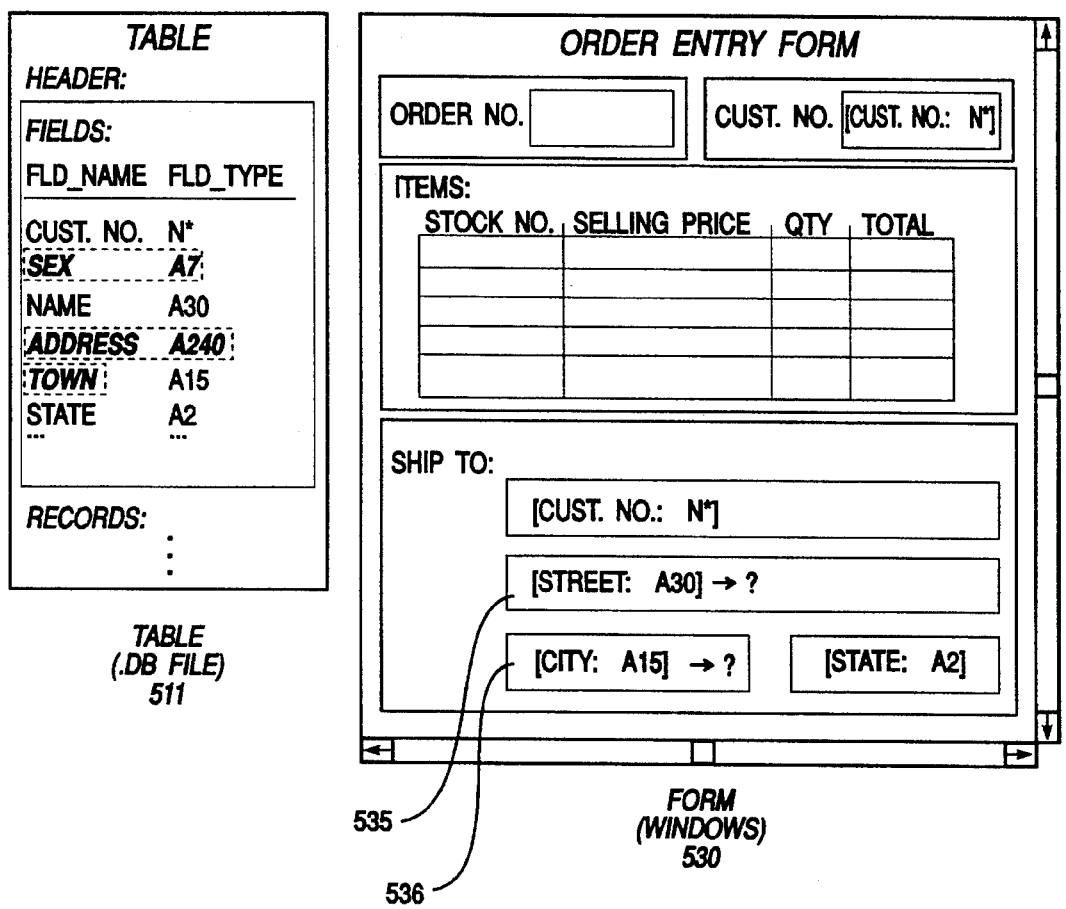
FIG. 5D is a block diagram illustrating the effect of the user change (of FIG. 5C) on the second form, which is optimized for a different operating system (than the one employed when the change to the table was made).
Figure 6B:
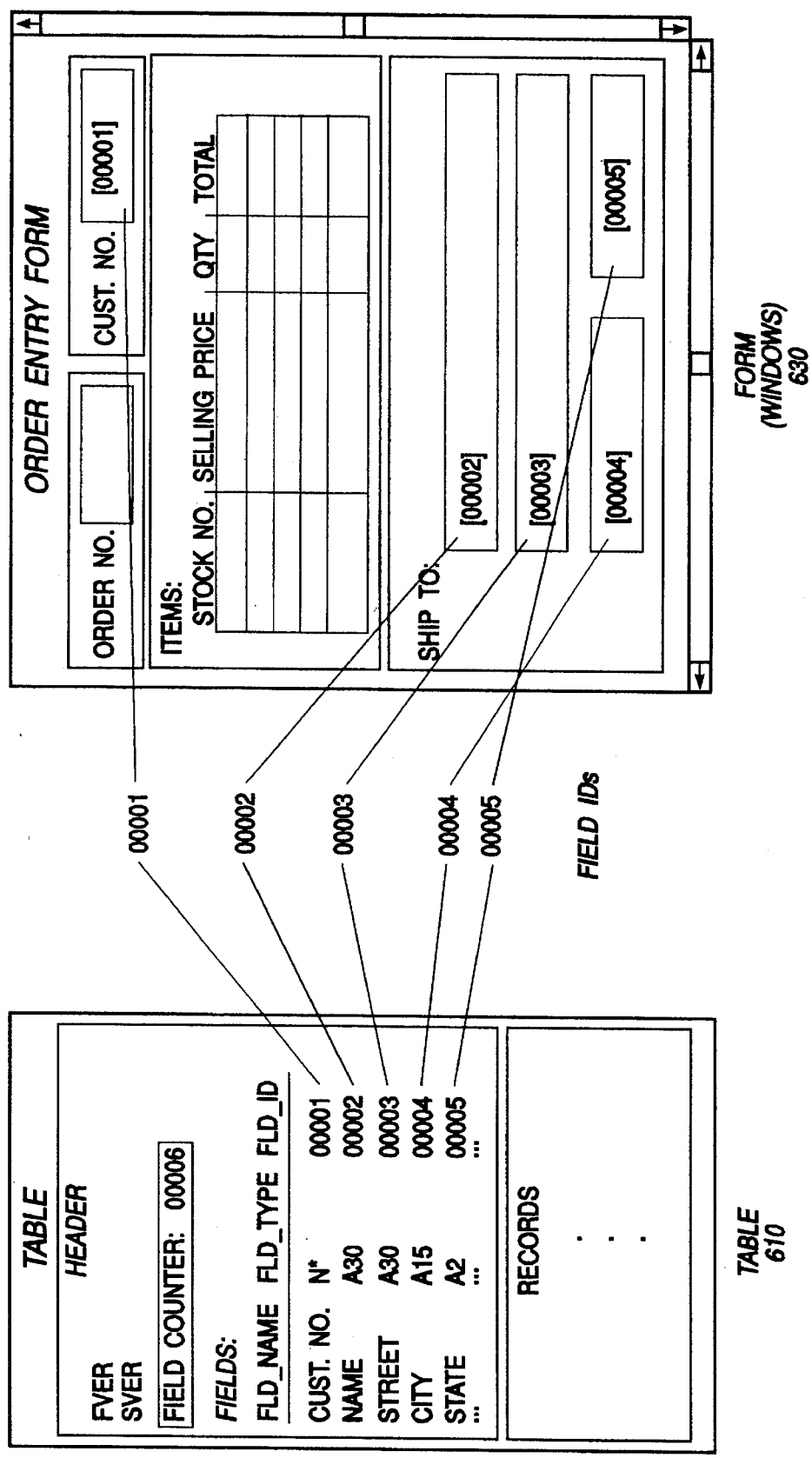
Figure 6C:
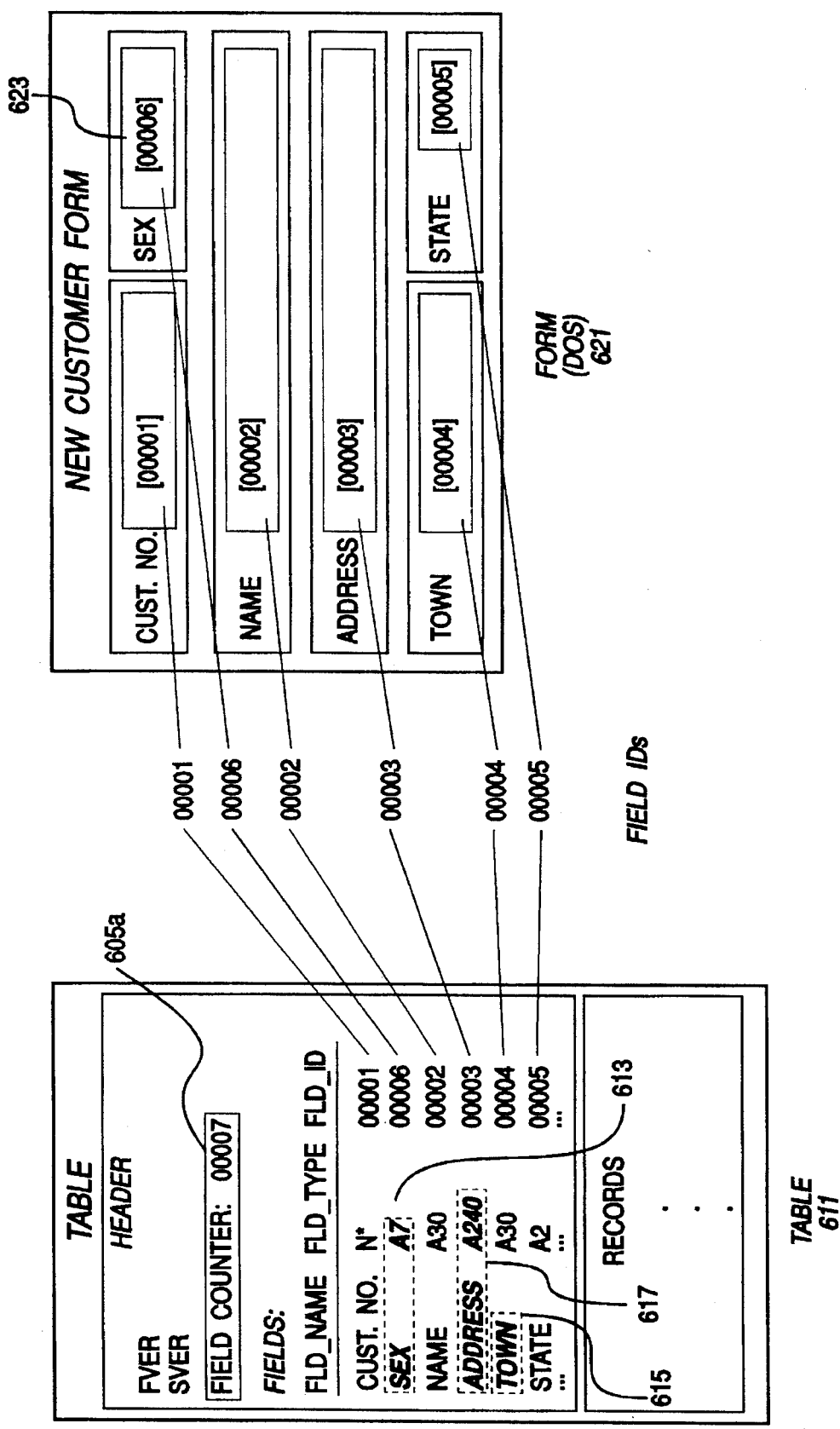
FIGS. 6C–D re diagrams illustrating the restructuring change of FIG. 5C, the diagram showing that linkage between a data entry field and its corresponding table field is maintained.
Figure 6D:
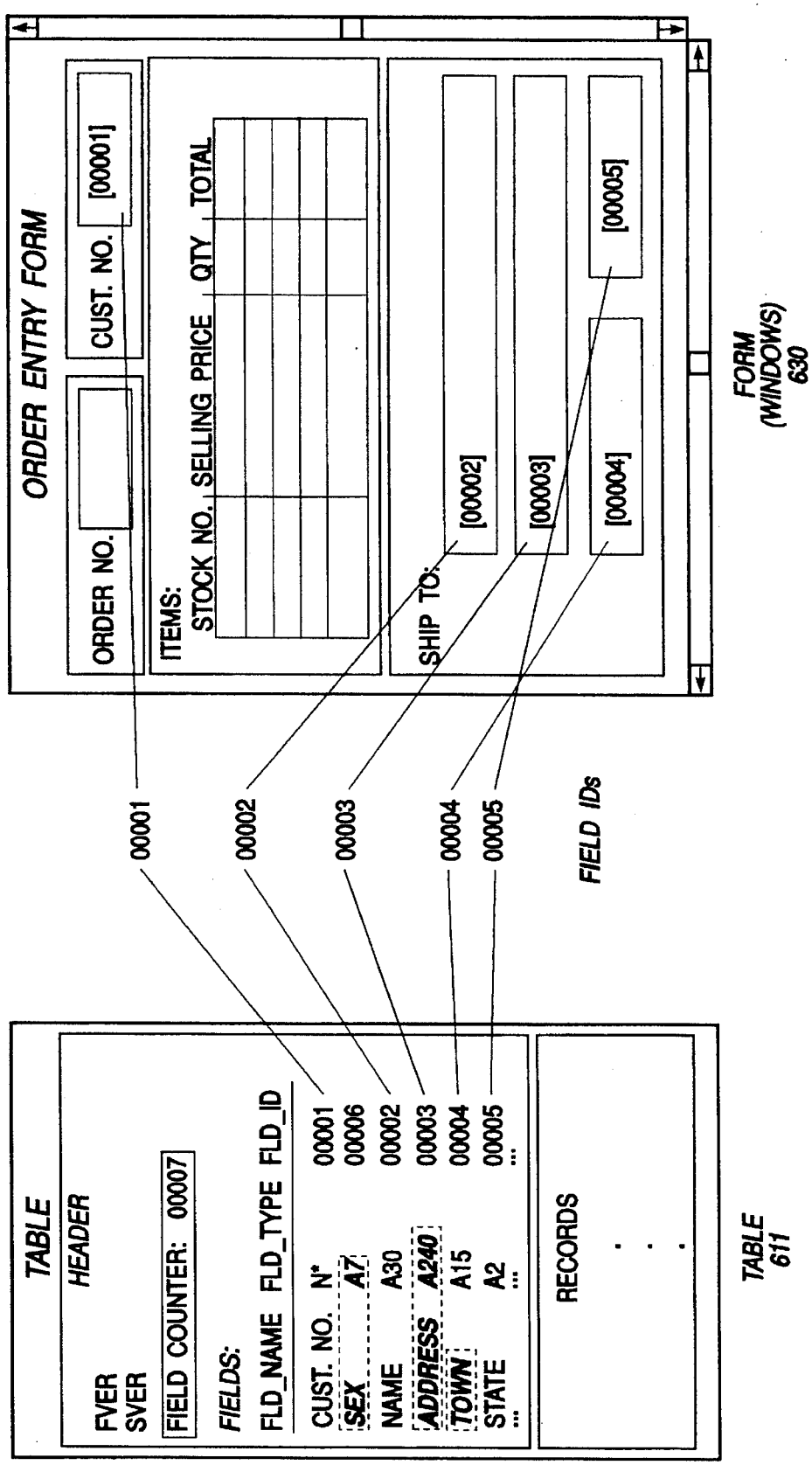

FIGS. 6C–D illustrate the effect of the previously-described table restructuring operation (illustrated in FIGS. 5C–D). In the example of FIG. 6C, the table has been restructured (the same as before) to yield table 611. In the table 611, two fields have been modified (fields 615, 617) and a new field (field 613) has been added (inserted) by the MS-DOS client user. The client has also modified the form 620, to create new form 621. As shown in FIG. 6C, the linkage between data entry fields of the form 621 and corresponding fields of the table 611 are unaffected by these modifications (as before). The newly added field 623 receives the field ID (value=00006) for the newly created field 613. The field counter 605 (shown as 605a) has been incremented, accordingly.

As shown in FIG. 6D, the foregoing restructuring of the commonly-shared table by the MS-DOS client does not invalidate the Windows form 630 (unlike before). Specifically, as each field ID uniquely identifies its field, the linkage between a data entry field on the form 630 and a corresponding field in the table 611 remains intact. Depending on a given restructuring change, a form or report may need to be updated; however, any such update may be performed with the best possible information available (to other, subsequent systems). Using the field IDs of the present invention, therefore, linkage information between forms of various systems and a centrally stored data table may be preserved despite restructuring of the table.

Figure 6E:
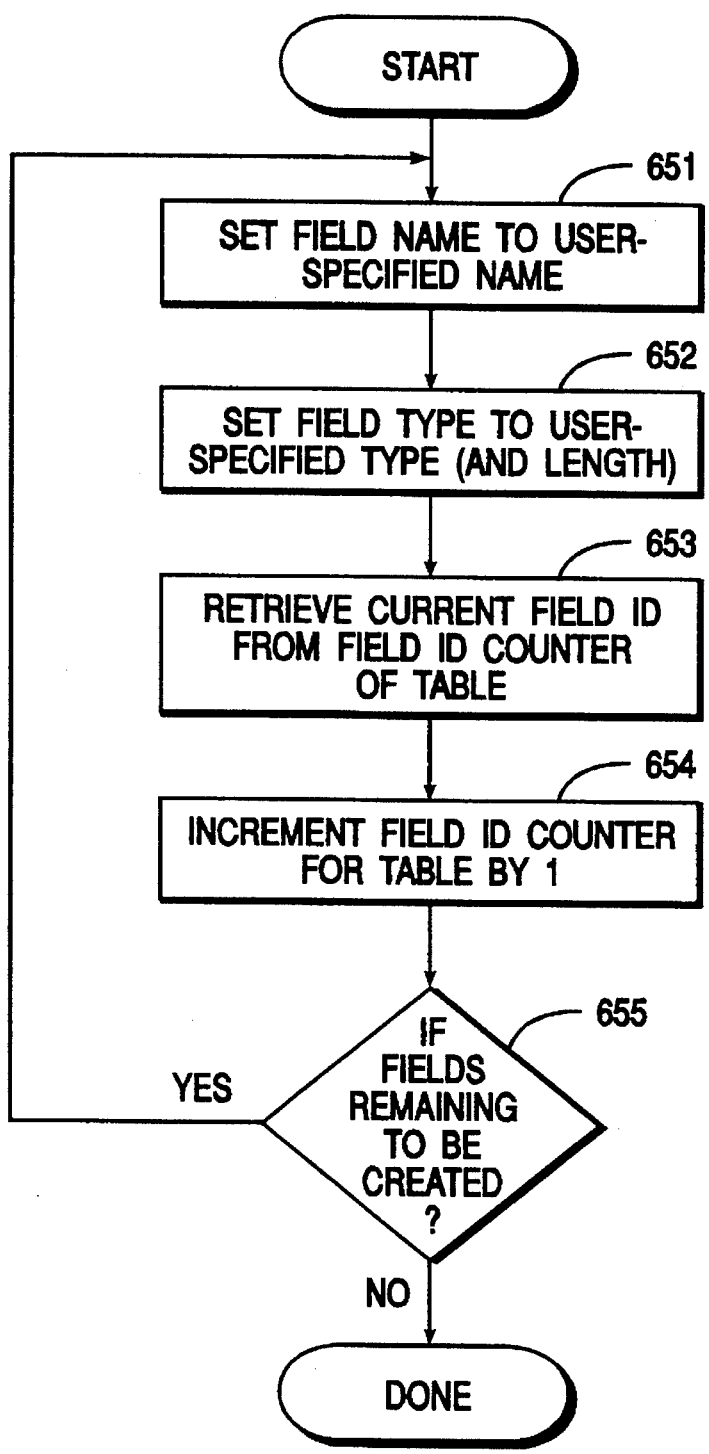
FIG. 6E is a flowchart illustrating a method of the present invention for creating fields in a table, where each field is assigned a unique identifier.
Figure 6F:
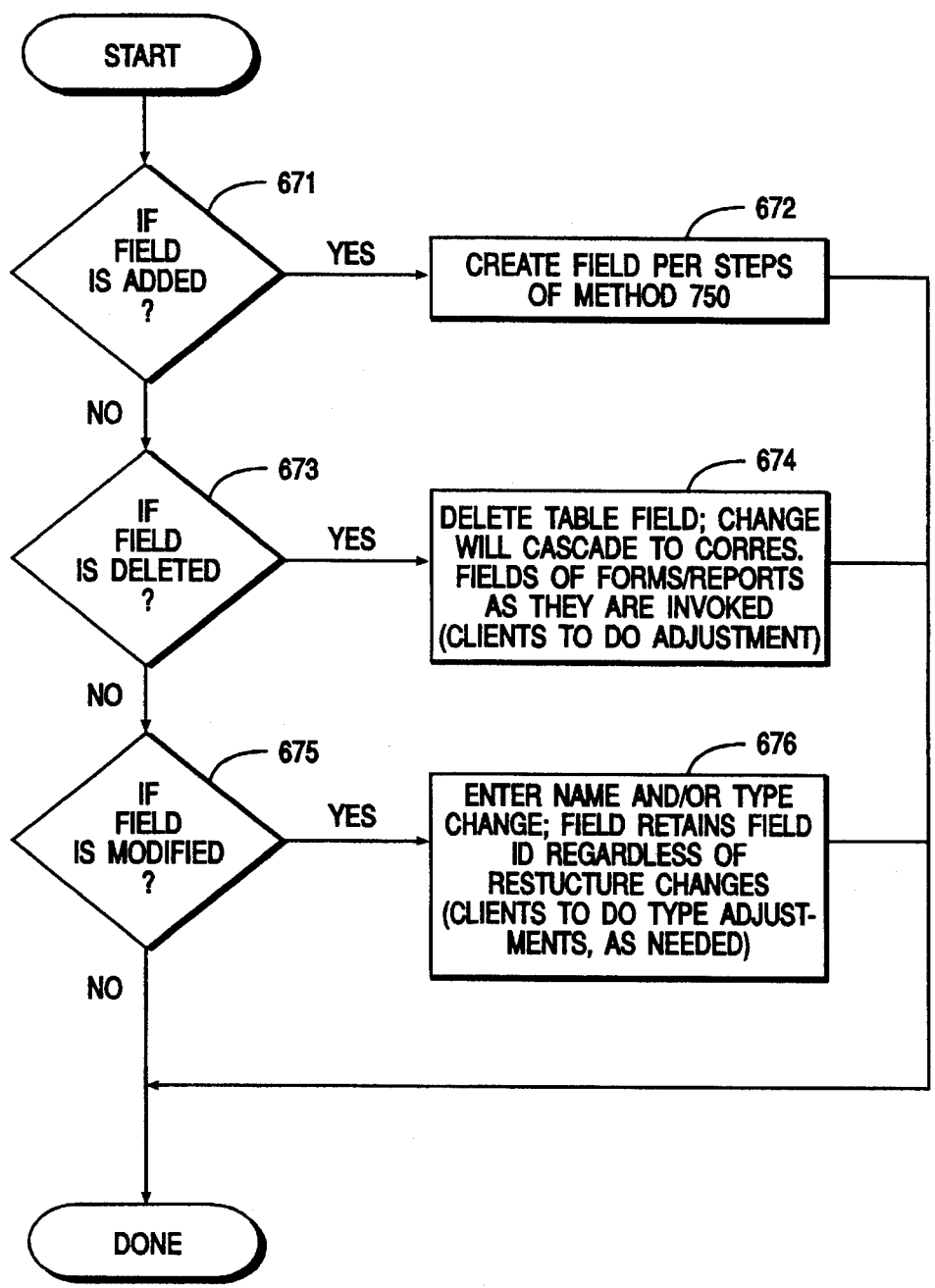
FIG. 6F is a flowchart illustrating a method of the present invention for restructuring a table.

Referring now to FIGS. 6E–F, methods of the present invention for creating table fields and for restructuring tables using field IDs will be described. In FIG. 6E, a method 650 for creating table fields includes the following steps. In step 651, the field name for the field being created is set to the user-specified name (text string). In step 652, the field type for the field being created is set to the user-specified type (e.g., number, alphanumeric, date, memo, binary-large object, and the like); in the instance of alphanumeric field types, the length of the field is set to the user-specified length. At step 653, the system retrieves the current field ID from the field ID counter of the table. As various forms and reports are created, their data entry fields will in turn store copies of field IDs for linking to corresponding fields of the table. At step 654, the field ID counter is incremented (by one), thus yielding another unique value for use by a subsequently created table field. At step 655, the method loops back to step 651 if any table fields remain to be created. At the conclusion of the steps, the method is done. Any required updating of forms/reports may be carried out by the individual clients, each having access to the information necessary to properly effect such an update.

In FIG. 6F, a method 670 of the present invention for restructuring a table is illustrated. In step 671, if a field is being added to a table (yes at the step), then the method proceeds to step 672 to perform the steps of method 650 (i.e., creating table field steps), after which the method concludes. If, on the other hand, a field is not being added at step 671, the method proceeds to step 673 to determine if the field is being deleted (i.e., removed from the table). If the field is being deleted (yes at the step), then the method proceeds to step 674 to delete the table field by removing its definition from the table header. The field ID for this former table field is thus also removed from the table definition; moreover, it is preferably not recycled (reused) by subsequent new fields. Any fields of forms and reports which are dependant upon the deleted field will be updated accordingly (e.g., its display "grayed out," or similar technique for indicating lack of a corresponding table field). After step 674, the method concludes.

If a field is not being deleted at step 673, the method proceeds to step 675 to determine if the field is being modified. If not (no at the step), then the field is unchanged and the method is done. If at step 675 the field is modified, the method proceeds to step 676. As shown at step 676, the field retains its field ID regardless of the restructured changes (provided of course that the field is not a newly added field or deleted). In a preferred embodiment, once a table has been restructured, the individual clients are responsible for updating their respective forms/reports (e.g., for reconciling disparities in data type between a data entry field and its corresponding table field). At the conclusion of step 676, the method is done.

Free-form ("Memo") field storage and free-space management

Figure 7A:
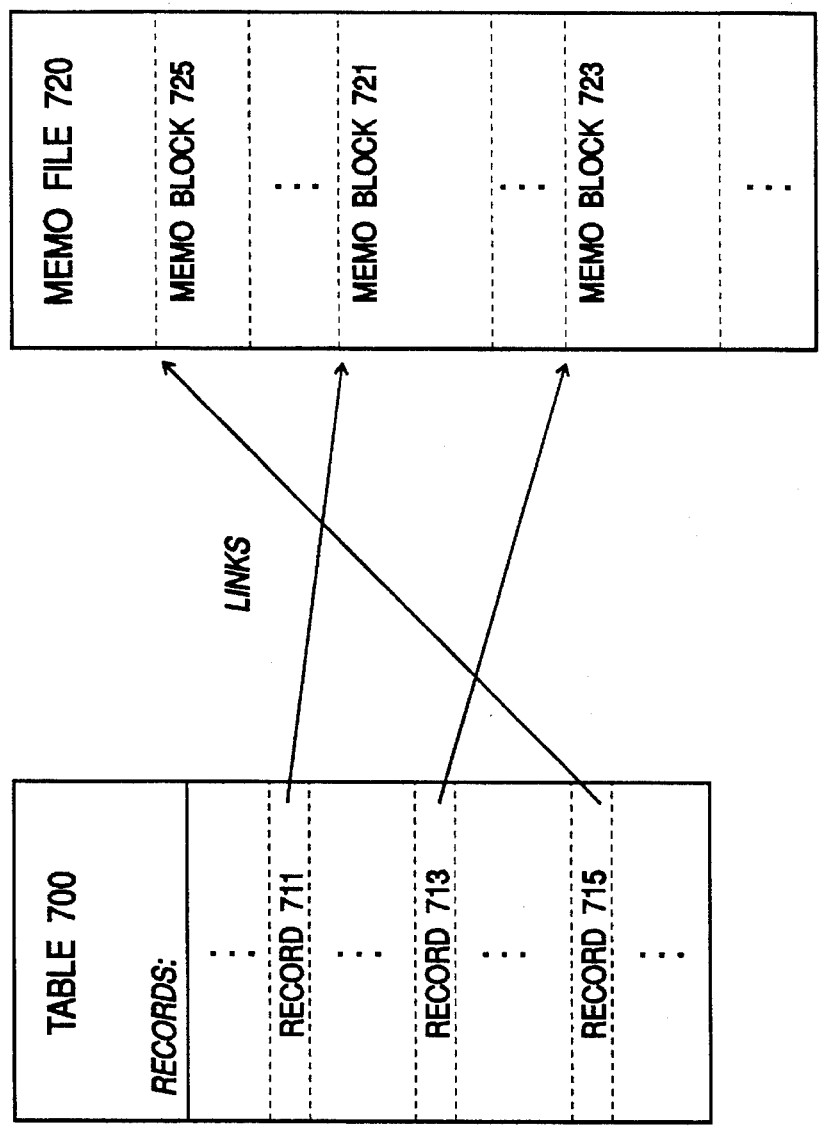
FIG. 7A is a block diagram illustrating the general relationship between an information table of the system of the present invention and its corresponding free-form or "memo" file.

Referring now to FIGS. 7A–D, a method of the present invention for free-form storage and management will be described. As shown in FIG. 7A, a database table 700 includes tuples or records, such as records 711, 713,715. In addition to storing the aforementioned field types (e.g., alphanumeric, number, date, and the like), a database may store free-form or "memo" information for each record. As shown in the figure, each record includes a pointer or link which connects the record to a particular memo block stored in a separate memo file, such as the memo file 720.

Conventional DBMS systems store memo information by allocating fixed-length storage blocks. In dBASE III®, for instance, a table of database records would store memo information in an accompanying memo file comprising 512-byte storage blocks. Unfortunately for the user, however, a record having only 40 bytes of memo information would require as much storage space as one having 500 bytes. Moreover, conventional systems include no free-space management which would allow reclamation of storage space which has been freed (e.g., after its corresponding database table record has been deleted).

Figure 7B:
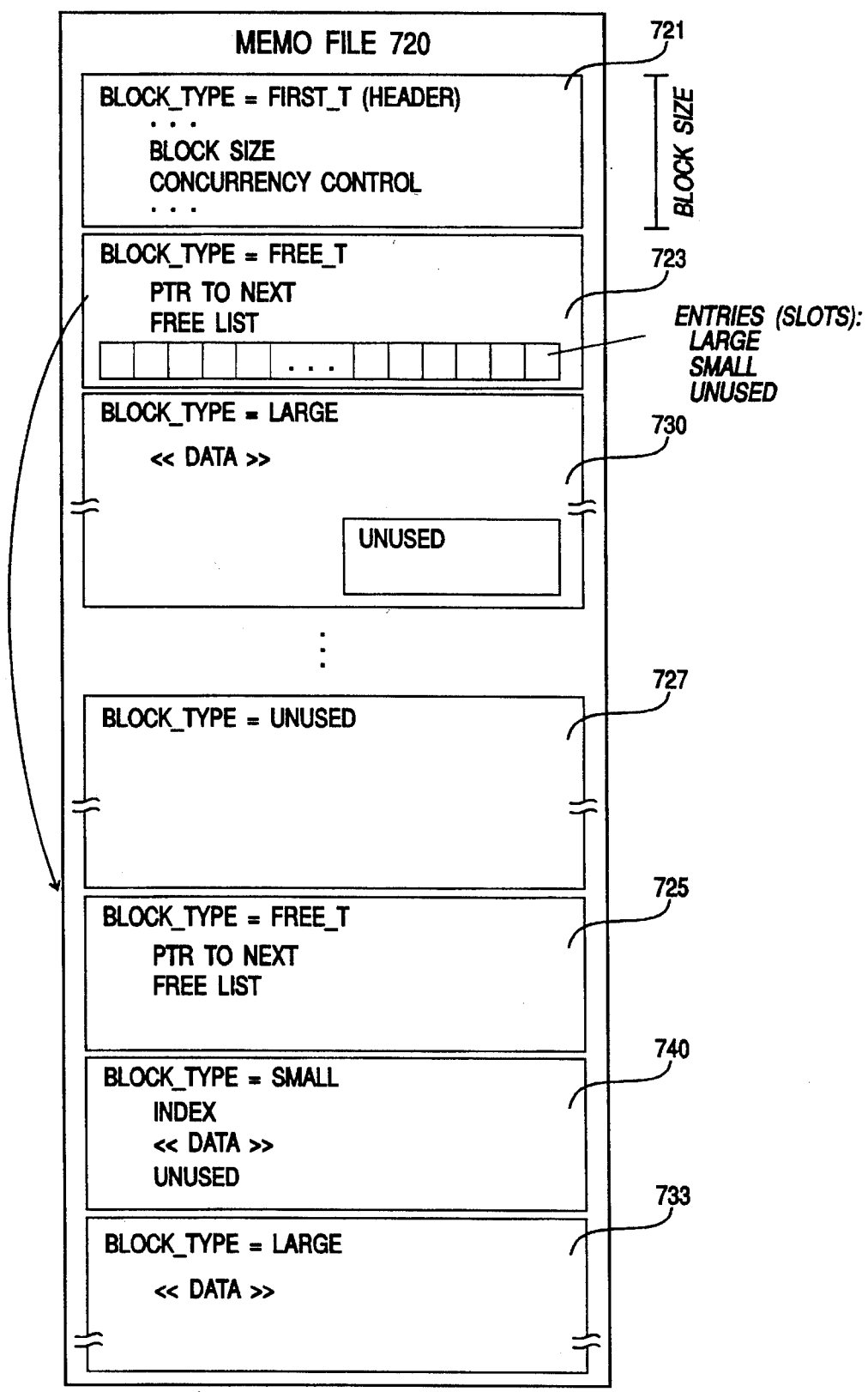
FIG. 7B is a block diagram presenting a detailed layout of the memo file of FIG. 7A.
Figure 7C:
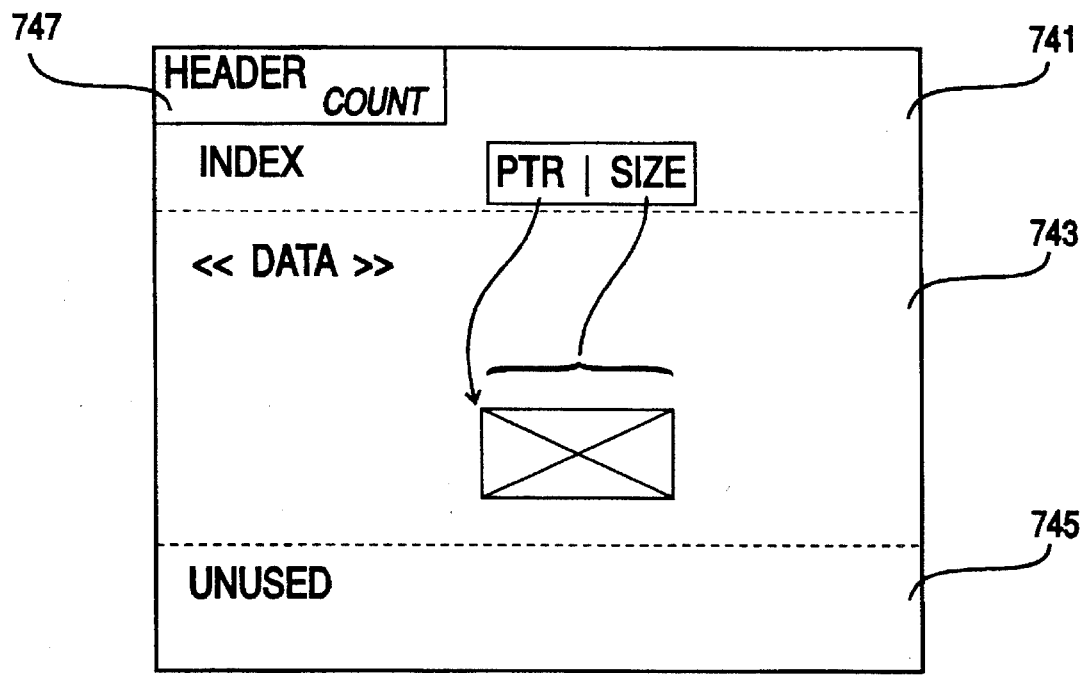
FIG. 7C is a block diagram illustrating a "small block" allocation unit of the memo file of FIG. 7B.

The construction and operation of an improved memo file 720 of the present invention will now be described with reference to FIG. 7B. The memo file 720 in the system of the present invention includes a header (FIRST_T) record 721 as its first record. The header stores housekeeping information for the file, including a native size for the storage blocks and concurrency (locking) information. The block size is adjustable, preferably in multiples of disk cluster size (e.g., 512, 1K, 2K, 4K, and the like).

Following the header block 721 is a free list block 723. Free list 723 stores free list entries which allow the system to perform space management. Each free list (e.g., list 723) is chained (points) to another free list (e.g., free list 725); the pointer of the last free list is set to NULL. In this fashion, there is no preset limit to the size which the memo file 720 may grow.

A free list itself includes entries which point to storage blocks, such as blocks 727, 740, 733. Specifically, each free list entry stores a pair comprising a pointer to an unused block and a size value indicating the storage available at that block. In this fashion, an allocation of storage space in the memo file 720 may be readily performed by scanning the free lists, searching for storage blocks matching the storage criteria for the allocation.

In a preferred embodiment, the free list is implemented as a logical free list that is smaller than the actual or physical free list which has been created. In other words, a free list may itself include unused entries. In the event that a particular free list is no longer required, its block may be reclaimed and, in turn, be represented as available in another free list.

The actual storage blocks themselves are available in two different sizes: large and small. Large data block 730, for instance, is a data block having a size which is a multiple of the native block size (i.e., multiple of 4K), that is sufficient for a particular storage allocation. For instance, if a data object requires 4 megabytes of storage, then a large block of 1000–4K blocks would be allocated accordingly. In a preferred embodiment, these would be allocated consecutively on the storage media, so that the data object residing in the large block may be read after a single disk seek operation. Moreover, this allows application clients to treat the data as an object residing at a particular disk region, without concern for underlying space management considerations.

A small block, such as block 740, is available for sub-allocation. Shown in further detail in FIG. 7C, small block 740 includes two portions: an index 741 and a data storage region 743. To provide sub-allocation, the index includes pairs of pointer/size entries which point to a region in the storage which has an available size associated with it. In a preferred embodiment, the small block sub=allocation is provided in units of 16-byte paragraphs. To allocate storage for 30 bytes, for instance, two 16-byte paragraphs (i.e., 32 bytes total) would be allocated from unused space 745. The corresponding index size entry would be set equal to 2 (i.e., two storage paragraphs). The corresponding pointer entry would be set equal to an offset within the data region 743, expressed in paragraph units.

Within a small block, there may exist a significant aggregate of unused space. Consider the following example. If a 4K allocation is required, for instance, the system searches in the free list among large blocks for a 4K allocation space; this may require a larger block to be "carved up" into a 4K block, with a remainder. In a preferred embodiment, this space is made available through the free lists. If a 30-byte allocation is required, the system searches for two 16-byte paragraphs, preferably found in small blocks. Accordingly, the small blocks are also referenced in the free lists. For efficiency, the small block includes a header 747 which stores a total consumed amount.

In a preferred embodiment, clients are not given direct access to data stored within a small block. In particular, storage allocation within a small block may be compacted by the system. Therefore, clients subscribing to data stored in a small block are preferably given a handle to their data, the handle being translatable by the system into appropriate pointer/size entry pairs.

As an optimization, the free lists may be sorted. Consider the following problem. Suppose a 4K block is freed. If the system can make a determination that storage blocks on either side of the just-freed block are also available, the corresponding entries to the blocks in the free list may be coalesced (to represent a larger contiguous block). For example, if the just-freed block had a 10K neighboring storage block to one side and a 12K neighboring storage block to the other side, then the system preferably expresses the storage region as a 26K unused storage block, thus minimizing fragmentation.

In such an instance, the system must consider the following factors. First, the system looks for a block with an address which is equal to the address of the just-freed block plus 4K, and looks for a block which ends at the address of the just-freed block (i.e., a block which starts at an address equal to the address of the just-freed block less its size). Since the free list may be composed of as many blocks as necessary to contain the list and will include small, large, and unused slots or entries, it may be computationally expensive to scan through the list in search of these neighboring blocks and perform the necessary calculations. In a preferred embodiment, therefore, each free list block is sorted as follows. The list is ordered having large slots first, sorted by respective disk addresses (so that that region of the free list may be searched by binary search technique). The large slots are, in turn, followed by unused slots, so that an unused slot may be found quickly. These in turn are followed by the small slots, which may be ordered by size. The system maintains pointers to each of these subregions so that the system may quickly access a subregion which corresponds to the allocation sought.

Figure 7D:
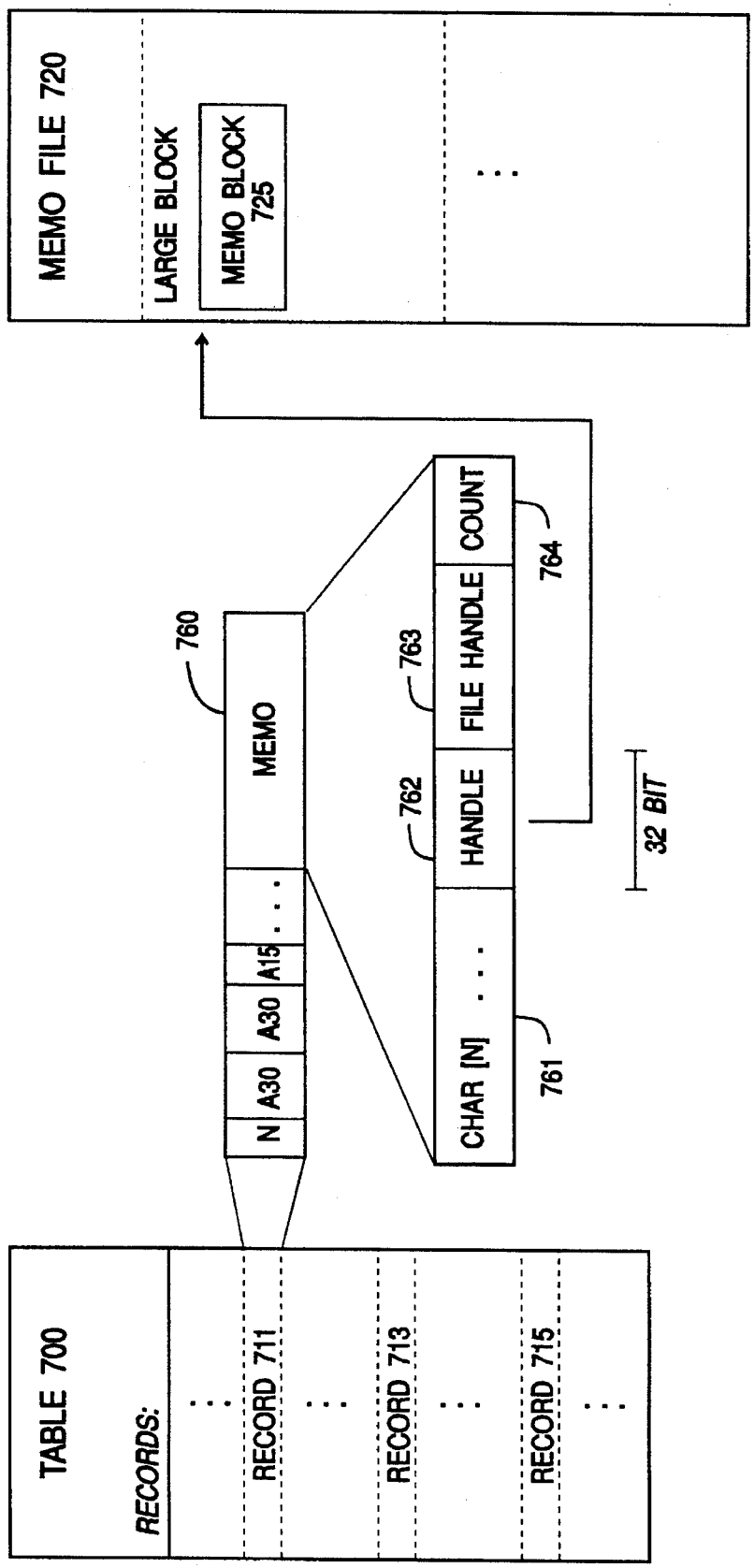
FIG. 7D is a block diagram illustrating the relationship between a tuple, its memo field, and a corresponding memo block which is referenced by the memo field.

Referring now to FIG. 7D, linkage between a memo field 760 of a table record 711 and a corresponding storage or memo block 725 is illustrated. The actual linkage employed depends on whether the storage block to be referenced is a large or small block. For a large block, a handle 762 (e.g., 32-bit quantity) is stored in the memo field 760 of table 700. In a preferred embodiment, the handle functions as an offset into the memo file 720. Since the storage blocks are aligned on 4K boundaries, the least significant bits will have values of zero.

Access to a small block begins in a similar manner, with the system de-referencing the most significant bits of the 32-bit handle for determining a particular small block (which is 4K aligned). The least significant bits of the 32-bit handle are also employed, however, as an index into the small block index 741. In this manner, a direct pointer to the small block for the memo field 760 is not given. Instead, the memo field 760 stores an offset to the small block of interest (stored in the most significant bits) and a handle (stored in the least significant bits) to the data object residing in the small block. As was described above, it is preferable to give a handle (instead of a direct pointer) so that the small block storage may be compacted by the system transparently.

Figure 7F:
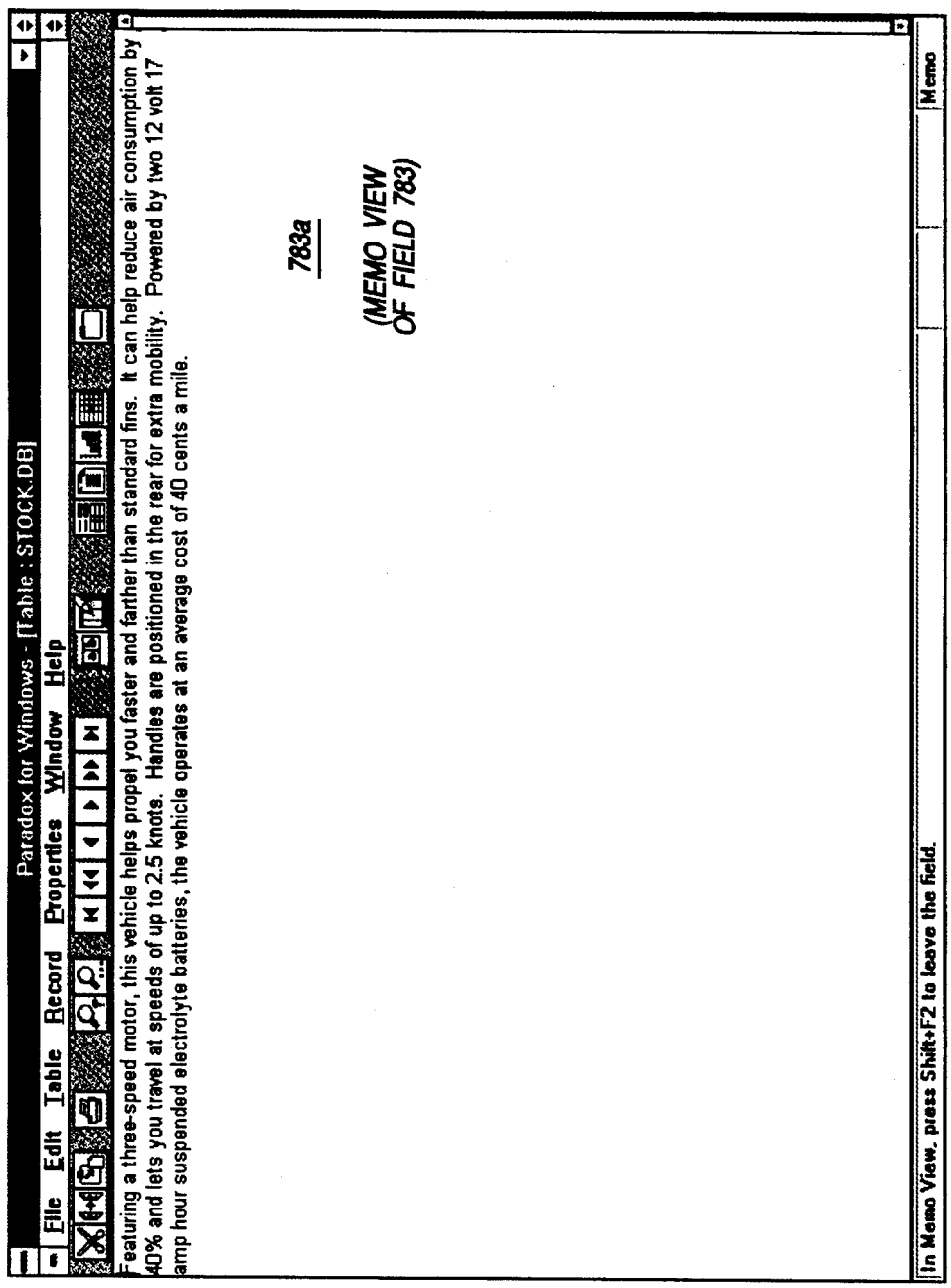
FIG. 7F is a screen bitmap illustrating a detailed view (memo view) of a memo field of a particular tuple.

The memo field 760, as stored in the record 711, includes a character field 761, a handle 762, a file handle 763, and a count 764. The character array or "text string" 761 is user-settable in size and stores the first N characters or bytes of the memo data object. By storing a portion of the data object with the tuple 711, the user may quickly browse among records in table view, without the system having to access data objects stored in the memo file. In FIG. 7E, for example, the Stock table is shown in table view 780. The table includes a Catalog Description 782 formatted memo field, as shown. For the tuple or record 781, for instance, the table view shows the memo field 783. By selecting the memo field 783 (e.g., double-clicking on the field), the user may go directly to the full memo data object 783*a*, as shown in FIG. 7F. In this manner, the system allows the user to browse among records containing memo fields, but the system accesses only those particular memo data objects which are of interest to the user (i.e., selected by the user).

Count 764 is employed to maintain concurrency between the memo field 760 and its corresponding storage block 725. A corresponding count is stored in the memo file. This allows the system to determine whether, when accessing an object, the memo file has changed (e.g., as a result of another user posting new data). If a user were retrieving an 8 megabyte data object across a network, for instance, the possibility exists that another user will have posted a change to the object before retrieval by the first user is completed. By maintaining corresponding counts, therefore, the system may detect the situation and provide appropriate data refresh, as required.

File handle 763 is employed to associate the field 760 with a particular memo file. The system of the present invention often performs large batch processes, such as queries or table restructures. In a query operation, for example, multiple tables may need to be joined. During the process, the system creates temporary tables of different structures which preferably do not include movement of memo data (which may be quite large). In such an operation, the last stage may be a projection operation which eliminates the memo fields from the final (answer) table. Thus, although there is a strict correspondence in a preferred embodiment between a table and its memo file, each memo field includes a file handle identifying the memo file. In this manner, as the various fields of tuples are processed during a batch operation, the system need not move or otherwise process the memo data associated with those fields until the final solution table is generated (at which time any required memo data may be copied into a memo file for the solution table).

Figure 8:
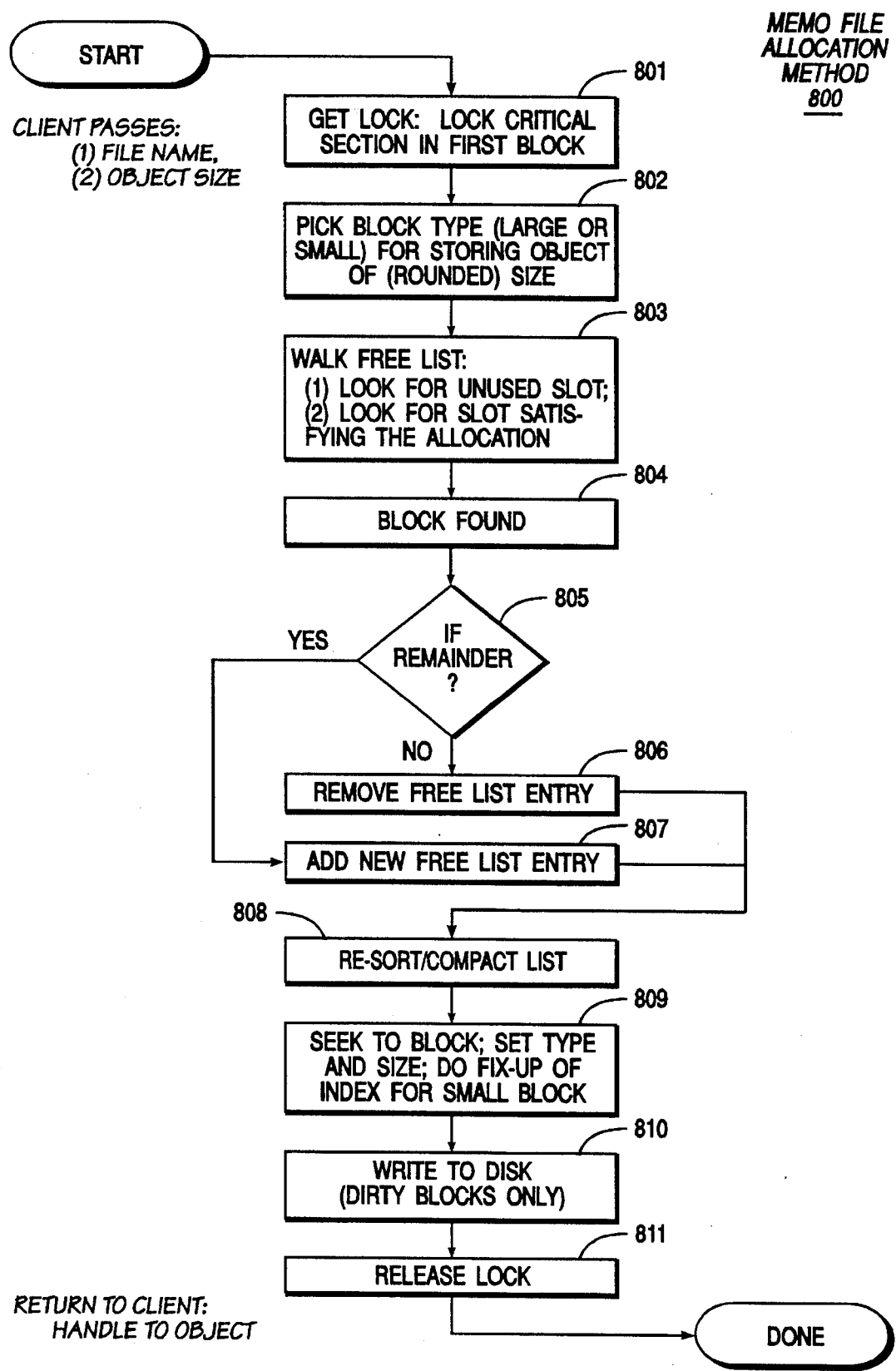
FIG. 8 is a flowchart illustrating a method of the present invention for allocating storage space for a free-form data object.

Referring now to FIG. 8, a method of the present invention for file allocation of a data object will be described. The method 800 is invoked by a client application which passes a file name (i.e., family name common to the table/memo) and an object size. At step 801, the system places a lock on the memo file (e.g., by locking a critical section in the first block, FIRST_T). At step 802, the method selects a block type best suited for storing the data object of the specified size (which may be rounded). If, for instance, the object size required is several kilobytes or more, the method selects a large block. On the other hand, if the object is only a few bytes in size, the method selects a small block.

At step 803, the method traverses the free list. In particular, the method looks for a slot satisfying the allocation; at the same time, the method also looks for an unused slot (to be employed in case a slot satisfying the allocation is not found). Step 804 indicates that a block is found. At step 805, the method determines if there is a remainder (left-over space) in the block just found. If not, the method proceeds to step 806 to remove the free entry list for this block. Otherwise (i.e., there is a remainder), the method proceeds to step 807 to add a new free list entry for this remainder.

After steps 806 and 807, the method proceeds to step 808 to re-sort and/or compact the free list, as needed. At step 809, the method seeks (disk seek operation) to the block. In the instance of a large block allocation, the method changes the type of the block from "unused" to "large"; the size (actually used by the data object) is also stored (e.g., in the header to the block). For small block allocation, on the other hand, the method does a fix-up of the index (in a manner as described above in FIG. 7C). At step 810, the method writes the information back to the storage disk (preferably, dirty blocks only). Finally, at step 811 the method releases the lock and returns a handle to the client.

Attached hereto is a microfiche Appendix containing source code listings which includes a description of the invention suitable for use in a general purpose digital computer system, such as an IBM-compatible personal computer. A suitable C/C++ compiler for compiling and linking the code is available from Borland International and other compiler vendors.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a system for processing data stored in information tables, each information table including data stored in data fields, a method for creating information tables and forms dependent from the tables, the method comprising:

(a) defining an information table to include at least one data field storing information of a particular data type, said data field including a field name;

(b) assigning each said at least one data field a unique ID automatically generated by the system for identifying the data field;

(c) creating a form having at least one form field which is set to correspond initially to one of said at least one data field by the field name;

(d) assigning each said at least one form field the unique ID for this corresponding data field; and retaining correspondence, by using said ID, between a form field and its data field when changes are made to either the field name or data type.

2. The method of claim 1, wherein step (a) includes:

specifying a field type for each said at least one data field.

3. The method of claim 2, further comprising:

(e) restructuring the information table by changing selected ones of a field name and a field type for at least one of said at least one data field.

4. The method of claim 1, wherein said information table includes a database file.

5. The method of claim 1, wherein step (b) includes:

storing a counter having a value in the information table; and for each data field defined, assigning the value of the counter as the unique ID for the data field and thereafter incrementing the counter.

6. The method of claim 1, wherein said unique ID includes a 16-bit quantity.

7. The method of claim 1, wherein said unique ID includes a value derived from a system date and time.

8. The method of claim 1, wherein said data type includes a selected one of alphanumeric, date, and number data types.

9. In a database management system, a method for creating a data table, the method comprising:

(a) maintaining a counter in the table, the counter storing a value for indicating how many data fields have been created for the table;

(b) creating at least one data field for the table by specifying a field name and a field type; and (c) storing with each data field created in step (b) the value of the counter, whereby each data field created for the data table includes a unique identifier for referencing said data field regardless of change to its field name or field type.

10. The method of claim 9, further comprising:

(d) creating a form having a form field dependent on a selected one of said at least one data field;

(e) modifying at least one of a field name or a field type of said selected data field; and (f) identifying the data field which the form field depends by matching the unique identifier with a corresponding one of a data field.

11. The method of claim 9, wherein said unique ID includes a 16-bit quantity.

12. The method of claim 9, wherein said field name includes user-supplied text, and wherein said field type includes a user-selected one of alphanumeric, date, and number data types.

13. A database system comprising:

a computer having a processor and memory;

a storage device coupled to said processor and memory for storing a database having information stored in data fields, each said data field having a field name and a field type;

a screen device coupled to said processor and memory;

software on said storage device for defining forms for displaying data fields selected from the database on the screen device; and software on said storage device for associating each data field of the database with a corresponding field displayed on the forms, said means including means for assigning each data field of the database a unique identifier which is unaffected by changes made to the field name or the field type of said each data field.

14. The system of claim 13, further comprising:

means for determining a correspondence between a field of a form and said data fields by comparing the unique identifier for a data field with a corresponding one stored with a field displayed on the form.

15. The system of claim 13, wherein said unique identifier includes a time/date stamp.

16. The system of claim 13, wherein said unique identifier includes a unique number selected from a counter stored with the database, said counter being incremented once for each data field of the database.

17. The system of claim 13, wherein said counter includes a selected one of a 8-bit, 16-bit, 32-bit, and 64-bit quantity.

18. The system of claim 13, further comprising:

means for detecting a data type incompatibility between a data field and a corresponding field of a form; and means for updating the corresponding field of the form to a data type which is compatible with said data field.

19. The system of claim 13, further comprising:

means for restructuring the database by changing selected ones of a field name and a field type for at least one of said at least one data field.

20. The system of claim 19, wherein said restructuring means includes:

means for inserting new data fields in the database, each said new data field including a unique identifier derived by incrementing a counter; and means for deleting data fields from the database.

21. The method of claim 13 wherein unique identifiers are time invariant when fields are added or deleted.

22. The system of claim 13 wherein said unique identifiers are persistent with time when a field is added or deleted.

* * * * *